(12) United States Patent
Shirasaka et al.

(10) Patent No.: US 10,509,114 B2
(45) Date of Patent: Dec. 17, 2019

(54) PHOTODETECTION DEVICE WITH SYNCHRONOUS AND NON-SYNCHRONOUS LIGHT DETECTION FOR REDUCING NOISE AND ELECTRONIC APPARATUS

(71) Applicant: SHARP KABUSHIKI KAISHA, Sakai, Osaka (JP)

(72) Inventors: Yasuyuki Shirasaka, Sakai (JP); Takuma Hiramatsu, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 253 days.

(21) Appl. No.: 15/563,521

(22) PCT Filed: Oct. 21, 2015

(86) PCT No.: PCT/JP2015/079726
§ 371 (c)(1),
(2) Date: Sep. 29, 2017

(87) PCT Pub. No.: WO2016/157582
PCT Pub. Date: Oct. 6, 2016

(65) Prior Publication Data
US 2018/0095167 A1    Apr. 5, 2018

(30) Foreign Application Priority Data
Mar. 30, 2015  (JP) ................................ 2015-070258

(51) Int. Cl.
*G01S 7/486*  (2006.01)
*G01V 8/12*   (2006.01)
*G01S 17/10*  (2006.01)

(52) U.S. Cl.
CPC ............ *G01S 7/4865* (2013.01); *G01S 17/10* (2013.01); *G01V 8/12* (2013.01)

(58) Field of Classification Search
CPC ...... G01S 7/4865; G01S 7/487; G01S 7/4873; G01S 7/497; G01S 17/10; G01S 17/026; G01S 7/483; G01S 7/4861; G01V 8/12
See application file for complete search history.

(56) References Cited

U.S. PATENT DOCUMENTS 4,707,094 A  * 11/1987  Tusting ................. G03B 17/04
                                                 396/28
2004/0099795 A1 *  5/2004  Waslowski ............... G01V 8/12
                                                 250/221

FOREIGN PATENT DOCUMENTS

JP      2008104064 A  *  5/2008
JP      2008-267884 A     11/2008
(Continued)

*Primary Examiner* — Que Tan Le
*Assistant Examiner* — Jennifer D Bennett
(74) *Attorney, Agent, or Firm* — ScienBiziP, P.C.

(57) ABSTRACT

Disturbance noise is distinguished and an appropriate detection result is output in accordance with a state of each disturbance noise. A signal processing circuit (11) of a photodetection device (101) includes non-synchronous detection units (112, 113) that detect existence of a light reception signal which is not synchronous with a light emitting drive timing in at least one of a case where it is determined that a value of the light reception signal exceeds a predetermined first threshold and a case where the value of the light reception signal becomes less than a predetermined second threshold in a non-synchronous detection period except a synchronous detection period in a detection period in the signal processing circuit (11). In addition, is a case where existence of the light reception signal which is not synchronous with the light emitting drive timing is detected by the non-synchronous detection units (112, 113), the signal processing circuit (11) maintains a result of the detection of the existence/non-existence of the light reception signal acquired by the synchronous detection unit in a subsequent detection period.

8 Claims, 12 Drawing Sheets

(56) References Cited

FOREIGN PATENT DOCUMENTS

| | | | |
|---|---|---|---|
| JP | 2013-156085 A | | 8/2013 |
| JP | 2013156085 A | * | 8/2013 |
| JP | 5535825 B2 | | 7/2014 |

* cited by examiner

PHOTODETECTION DEVICE WITH SYNCHRONOUS AND NON-SYNCHRONOUS LIGHT DETECTION FOR REDUCING NOISE AND ELECTRONIC APPARATUS

TECHNICAL FIELD

The present invention relates to a photodetection device and an electronic apparatus which includes the photodetection device.

BACKGROUND ART

An electronic apparatus such as a mobile phone, a smartphone, a tablet information terminal, or a digital camera includes a display screen such as a liquid crystal display. In such electronic apparatus, the extent of approach of a human body to the apparatus is detected and various controls are performed. In addition, the display screen of the electronic apparatus also functions as a touch panel to input information.

Therefore, there is a case where a function of the touch panel needs to be turned off so that the electronic apparatus does not erroneously operate even if any object approaches the touch panel when a user performs an operation of starting a call or storing the electronic apparatus in a pocket. In addition, in the digital camera, such control that automatically lowers brightness of the display screen is performed when the user moves a visual line from the display screen to a viewfinder.

For such a purpose, a small and inexpensive optical photodetection device (object detection sensor) is used. The photodetection device determines the extent of approach of an object to be detected, by detecting pulsed light which is emitted by the photodetection device and reflected from the detected object. In the field of the photodetection device, a photodetection device which is used for such a purpose is generally called a proximity sensor.

In addition, in an office electronic apparatus, such as a copying machine or a printer, a photodetection device, which operates on the same principle as in the proximity sensor, is used in order to detect rotations, origin points or endpoints of various movable mechanical units, or in order to sense existence/non-existence of paper in a specific spot. Specifically, the photodetection device detects or determines existence/non-existence of light emitted by the photodetection device and reflected from the detected object or light emitted by the photodetection device and transmitted through a transmitting part of the detected object. In the electronic apparatus, control for each unit is performed based on a result of the detection performed by the photodetection device. In the field of the photodetection device, the photodetection device which is used for such a purpose is generally called a photo-interrupter.

The present invention is targeted, in the photodetection devices described above, at particularly a photodetection device which detects determines existence/non-existence of the detected object by detecting pulsed light which is emitted by the photodetection device and is reflected from the detected object, and a photodetection device which detects or determines the existence/non-existence of the detected object or a thickness of the detected object using light transmitted between a light emitting element and a light receiving element.

It is obvious to those skilled in the art that, in a case where the pulsed light is used as a signal, a degree of freedom in design is acquired with high resistance to disturbance light noise under various environments as compared to a case where signal light is DC light. The disturbance light noise includes sunlight, lighting equipment such as incandescent light, inverter fluorescent light, or the like, white LED light PWM-modulated, and the like. In addition, it is obvious to those skilled in the art that, in a case where the light emitting element is driven with pulses, it is possible to reduce power consumption as compared to a case where the light emitting element is driven in a DC manner.

In addition, in a case where the photodetection device is mounted on an electronic apparatus such as a copying machine or a personal computer which is connected to an alternating current power source for home use, or an electronic apparatus which has a motor or the like that is a noise generation source, it is necessary to increase resistance to a malfunction of the photodetection device due to high frequency noise which is superimposed on a power source line.

A typical pulse-emission photodetection device will be described. The photodetection device includes a light emitting element, a light receiving element, and a circuit element. The circuit element includes a light emitting element drive circuit, an IV conversion circuit (current voltage conversion circuit), an amplification circuit, a comparator circuit, a signal processing circuit, a timing generation circuit, and the like. Typically, for cost reduction, the light receiving element and the circuit element except the light emitting element among the above-described circuits are integrated on one semiconductor substrate in many cases.

FIG. 8 illustrates an example of a configuration of a typical photodetection device 501.

As illustrated in FIG. 8, in the photodetection device 501, in many cases, a differential amplification circuit 51 is generally used as the amplification circuit in order to improve resistance to a malfunction due to, for example, high frequency noise which is superimposed on the power supply line. An output terminal of the light receiving amplifier circuit 54 is connected to a positive input terminal of the differential amplification circuit 51 through a first high-pass filter circuit 55. The light receiving amplifier circuit 54 includes a light receiving element 52, such as a photodiode, and an IV conversion circuit 53 that has an input terminal to which the light receiving element 52 is connected. An output terminal of a dummy amplifier circuit 59 is connected to a negative input terminal of the differential amplification circuit 51 through a second high-pass filter circuit 60. The dummy amplifier circuit 59 includes a dummy light receiving element 57 that has a light receiving surface which is shaded by a metal layer or the like, and an IV conversion circuit 58 (which has the same configuration as the IV conversion circuit 53) that has an input terminal to which the dummy light receiving element 57 is connected.

In the differential amplification circuit 51, a difference voltage (=light receiving amplifier output voltage−dummy amplifier output voltage) between voltages, which are respectively input t the positive input terminal and the negative input terminal, is amplified. With such a differential configuration, high frequency noise or the like, which is superimposed on respective signal lines of the light receiving amplifier circuit 54 and the dummy amplifier circuit 59 in phase, is removed from the power supply line or the like in phase. Therefore, a malfunction of a photodetection device 501 due to noise superimposed on the power supply line, or the like is suppressed. Furthermore, even in the differential configuration, reflected light or transmitted light is not incident on a light receiving surface of the dummy light receiving element 57, and thus a normal pulse signal not reduced. In a photodetection device disclosed in PTL 1, a similar differential configuration is used.

The photodetection device 501 which is configured as described above operates as follows. First, in a case where the light emitting element 62, such as an LED, is caused to emit pulsed light based on a light emitting element drive pulse (A) by the light emitting element drive circuit 61, the light receiving element 52 receives reflected light (B) that is light from the light emitting element 62 and reflected by a detected object 63. Alternatively, in a configuration in which light is emitted from the light emitting element 62 toward the light receiving element 52, light that is emitted from the light emitting element 62 and transmitted through the detected object 63 is received using the light receiving element 52.

A current pulse signal, which is output from the light receiving element 52, is converted into a voltage pulse signal (light receiving amplifier output (C)) by the IV conversion circuit 53 (current voltage conversion circuit). The voltage pulse signal and a dummy amplifier output (D) from the dummy amplifier circuit 59 are differentially amplified by the differential amplification circuit 51 (differential amplification circuit output (E)). In the comparator circuit 64, the differential amplification circuit output (E) is compared with a predetermined threshold voltage (F). In a case where an amplitude value of the differential amplification circuit output (E) exceeds the threshold voltage (F), the comparator circuit 64 outputs a digital pulse signal (comparator output (G)) to the signal processing circuit 65. As illustrated in FIG. 9, the signal processing circuit 65 includes an AND circuit 65a and an SR latch circuit 65b as a configuration for synchronous detection, and includes an AND circuit 65c and an SR latch circuit 65d as a configuration for non-synchronous detection.

In the signal processing circuit 65, whether or not the output signal of the comparator circuit 64 coincides with timing of the light emitting element drive pulse (A) (synchronous detection gate signal (H)) is detected by the AND circuit 65a and the SR latch circuit 65b (synchronous light detection). The existence/non-existence of the detected object 63 or the like is determined according to a result of the detection. In addition, in a case where high disturbance light noise resistance and high power supply line noise resistance are desired, whether or not comparator output (G) is output at timing other than the light emitting element drive pulse (A) by the AND circuit 65c and the SR latch circuit 65d in the signal processing circuit 65 is detected (non-synchronous light detection). A non-synchronous detection gate signal (I) is output at timing other than the light emitting element drive pulse (A). There is a case where the existence/non-existence of the detected object the like is determined through combination of a result of the synchronous light detection and a result of the non-synchronous light detection.

A result of determination performed by the signal processing circuit 65 is output, as detection or non-detection, to an external output terminal through the output circuit 66.

The timing generation circuit 67 is composed of a logical circuit, and generates various timing signals based on an output signal (clock signal (P)) of the oscillation circuit 68. Specifically, the timing generation circuit 67 generates a measurement cycle (cycle of light emission, detection, output, or the like), the light emitting element drive pulse (A), the gate signal (the synchronous detection gate signal (H) or the non-synchronous detection gate signal (I)), which is synchronous or non-synchronous with a light emission pulse for synchronous or non-synchronous detection, a reset signal (L) which is used to initialize each of the circuit elements, and the like.

FIG. 10 illustrates a detailed example of operational waveforms of the reflected-light-detection photodetection device 501 according to the related art. FIG. 10 illustrates waveforms of three cycles corresponding to a measurement period, illustrates respective waveforms up to two cycles on the left side in a case where the detected object 63 exists, and illustrates each waveform in one cycle on the right side in a case where the detected object 63 does not exist.

The clock signal (P), which is output from the oscillation circuit 68, includes an output signal which regularly repeats high and low states by 8 times in one cycle which is divided into 16 parts in the example. For example, in a case where it is assumed that one pulse width is 10 μsec, one cycle is 160 μsec.

The light emitting element 62 is driven with pulses at least one time per one cycle by a light emitting element drive pulse (A). In a case of the existence of the detected object 63, the reflected light (B) from the detected object 63 is received by the light receiving element 52. As a result of input of an output pulse current signal from the light receiving element 52 into the IV conversion circuit 53, a positive voltage pulse signal is output from the light receiving amplifier circuit 54 (light receiving amplifier output (C)). Here, since the light receiving surface of the dummy light receiving element 57 is shaded, the voltage pulse signal is not generated in the output of the dummy amplifier circuit 59 (dummy amplifier output (D)).

The light receiving amplifier output (C) and the dummy amplifier output (D) are input to the differential amplification circuit 51 through the first high-pass filter circuit 55 and the second high-pass filter circuit 60, respectively, a difference voltage between the light receiving amplifier output (C) and the dummy amplifier output (D) is amplified by the differential amplification circuit 51 (differential amplification circuit output (E)). Here, in a case where in-phase noise, such as power supply line noise, is superimposed on an output line of the light receiving amplifier circuit 54 and output line of the dummy amplifier circuit 59, the in-phase noise is removed in phase by the differential amplification circuit 51. The output signal (differential amplification circuit output (E)) of the differential amplification circuit 51 is compared with the threshold voltage (F) by the comparator circuit 64. In a case where the output signal (differential amplification circuit output (E)) of the differential amplification circuit 51 exceeds the threshold voltage (F), a pulse signal is output from the comparator circuit 64 (comparator output (G)).

Furthermore, in the signal processing circuit 65, it is determined whether or not the comparator output (E) coincides with light emitting pulse timing (synchronous detection gate signal (H)). In a case where the comparator output (G) coincides with the light emitting pulse timing, the existence of the detected object is determined, and a result of the determination is output. In the signal processing circuit 65, the comparator output (G) and the synchronous detection gate signal (H), which is synchronous with a light emitting pulse, are respectively input to two input terminals of the AND circuit 65a. An output terminal of the AND circuit 65a is connected to an S input terminal SET of the SR latch circuit 65b, and the reset signal (L) is input to an R input terminal RESET.

A synchronous detection latch output (J) is inverted to a high level in a case where the comparator output (G) coincides with the light emitting pulse timing, that is, only in a case where both the comparator output (G) and the synchronous detection gate signal (H) become the high level in FIG. 10, and is initialized to a low level for each measurement cycle through input of the reset pulse signal (L). In this manner, the existence/non-existence of the detected object 63 is determined in each cycle. In the signal processing circuit 65, the existence/non-existence of the detected object is determined at any timing (for example, indicated by downward arrows in FIG. 10) based on the synchronous detection latch output (J). Specifically, in a case where the synchronous detection latch output (J) is at the high level, it is determined to be the "existence of the detected object" and a detection output (M) is set to the high level. In contrast, in a case where the synchronous detection latch output (J) is at the low level, it is determined to be "non-existence of the detected object" and the detection output (M) is set to the low level.

Meanwhile, contrary to the above case, in a case where the detection output (M) is set to the low level, it may be determined to be the "existence of the detected object" and in a case where the detection output (M) is set to the high level, it may be determined to be the "non-existence of the detected object".

In addition, in the example, a case is illustrated where non-synchronous light sensing is performed in order to increase sensing accuracy. Even in a case where synchronous light is sensed and it is determined to be the existence of the detected object, it is assumed that non-synchronous light is detected in a case where a pulse signal is output as the comparator output (G) in a period in which the non-synchronous detection gate signal (I) is output. In this case, the result of determination that is the non-existence of the detected object (forced non-detection) as final determination non-determination (previous state is maintained) is output. In addition, similarly to the synchronous light detection, in the non-synchronous light sensing, the comparator output (G) is maintained as non-synchronous detection latch output (K) by the AND circuit 65c and the SR latch circuit 65d of the signal processing circuit 65. Therefore, in a case where a pulse signal of the comparator output (G) is sensed at least one time within the period in which the non-synchronous detection gate signal (I) is output, it is determined to be existence of the non-synchronous light.

In the example, a case where the output is determined per cycle is illustrated. However, in a case where the same determination is continuously acquired a plurality of times, in order to avoid a malfunction, the final existence/non-existence of the detected object 63 is sensed and determined and thus it is possible to improve sensing accuracy.

In addition, as the related art which is intended to improve sensing accuracy under the disturbance light, for example, PTL 2 discloses an object detection circuit which determines whether or not a pulse width of pulsed light sensed by the light receiving element coincides with (synchronous with) a pulse width of light radiated from the light emitting element using a pulse width sensing circuit.

Furthermore, PTL 3 discloses a technique which is capable of reducing erroneous sensing with respect to a case where minute reflected light and disturbance light from an object, which is not a sensing target, exist and there is a possibility of a malfunction occurring if a sum of the reflected light and the disturbance light is input to the light receiving element. PTL 3 discloses the following (1) to (3) as means for avoiding the malfunction due to the disturbance light.

(1) In a case where non-synchronous disturbance light is sensed, a malfunction due to the non-synchronous disturbance light is avoided by increasing a determination level of synchronous light.

(2) The malfunction due to the non-synchronous disturbance light is avoided by measuring a non-synchronous disturbance light level and increasing the determination level of the synchronous light in accordance with a measured value.

(3) In a case where a plurality of pulses are sensed in the synchronous light sensing, it is determined that a malfunction due to the disturbance light is generated.

CITATION LIST

Patent Literature

PTL 1: Japanese Unexamined Patent Application Publication No. 2013-156085 (published Aug. 15, 2013)
PTL 2: Japanese Unexamined Patent Application Publication No. 2008-267884 (published Nov. 6, 2008)
PTL 3: Japanese Patent No. 5535825 (issued May 9, 2014)

SUMMARY OF INVENTION

Technical Problem

As described above, a pulse-modulation photodetection device determines the non-existence of the detected object (forced non-detection) or does not perform determination (maintains previous state) in a case where the synchronous light is detected but the non-synchronous light is also detected. Accordingly, the malfunction due to the disturbance light is avoided.

In addition to the DC light, AC light noise such as inverter fluorescent light exists as the disturbance light. There is a case where the DC light and AC light noise change in a measurement cycle period. Furthermore, it is desired that malfunction of the pulse-modulation photodetection device does not occur also in a case where electrical noise due to application of electrostatic discharge (ESD) or the like is singly input in addition to the disturbance light noise. As an ideal pulse-modulation photodetection device, it is desirable that detection output is forcedly non-detected in order to avoid a malfunction of fixedly outputting the "existence of the detected object" in a case where the AC light noise, which is continuously incident like inverter fluorescent light, is sensed. In addition, with respect to disturbance noise (change of the DC light in the measurement cycle period, electrical single noise due to ESD application, or the like), which is incident in a relatively short period, other than the DC light and the AC light noise such as the inverter fluorescent light, it is desirable to maintain the detection output in a state which is detected the previous time. However, in the related art, it is difficult to avoid the malfunction with respect to the disturbance noise of all kinds.

FIG. 11 illustrates a case where DC light increases in the measurement cycle period as a detailed example of waveforms of a reflected-light-detection photo detector when disturbance light is incident. FIG. 11 illustrates an example in a case where the DC light increases only in a second cycle. In description with reference to FIG. 11, the same parts as those described with reference to FIG. 10 are not described. As an example of the change of the DC light in a short time, a case where, for example, the DC light is shaded by a person crossing in a state in which the DC light is incident on the pulse-modulation photodetection device or a case where an intensity of the DC light linearly decreases or increases when the DC light is incident are conceivable.

FIG. 11 illustrates waveforms of three cycles corresponding to the measurement period, and illustrates waveforms in a case where the detected object exists in all the three cycles. Since the detected object 63 exists in all the three cycles (detection period), a determination result is desirable in which the detection output (M) becomes the high level (sensing) in the first cycle and the detection state is continued after the first cycle. However, in the second cycle, the DC light linearly increases. Therefore, in a case where the differential amplification circuit output (E) exceeds the threshold voltage (F) in the non-synchronous light sensing period, the pulse signal is output as the comparator output (G) in the non-synchronous light sensing period.

It is determined whether or not a logical level of the comparator output (G) coincides with a logical level of the non-synchronous detection gate signal (I) by the AND circuit 65c and the SR latch circuit 65d of the signal processing circuit 65. In this example, a logical level of the pulse signal coincides with the logical level of the non-synchronous detection gate signal (I), and thus the non-synchronous light is detected as a result of the non-synchronous detection latch output (K) being inverted to the high level. Therefore, even in a case where it is determined to be the existence of the detected object based on the synchronous detection latch output (J), a result of determination corresponding to the non-detection is forcedly output as the detection output (M).

In the related art, in a case where the comparator output (G) is output in the non-synchronous light sensing period, a result of determination that is the non-existence of the detected object (forced non-detection) as final determination of the detection output (M) or non-determination (previous detection state is maintained) is output. In a detailed example, a case of the non-existence of the detected object (forced non-detection) is illustrated. In a case where the non-existence of the detected object (forced non-detection) is determined in the non-synchronous light detection, it is possible to avoid a malfunction under AC light such as the inverter fluorescent light which is continuously incident. However, here, even in a case where it is desired to maintain detection output when the disturbance noise other than the AC light is input, the result of detection corresponding to the non-existence of the detected object (forced non-detection) is output. In contrast, in a case where determination is not performed in the non-synchronous light sensing period (previous detection state is maintained), a malfunction in which the detection output (M) corresponding to the "existence of the detected object" is fixed may be generated under the AC light which is continuously incident.

The present invention is made in consideration of the above problem, and an object of the present invention is to provide a photodetection device which distinguishes between AC light noise such as inverter fluorescent light and the other disturbance noise and which outputs an appropriate detection result in accordance with respective states of the disturbance noise.

Solution to Problem

In order to address the above problems, a photodetection device according to an aspect of the present invention includes a light emitting element that emits pulsed light; a light receiving element that receives, from a detected object, reflected light or transmitted light of the pulsed light and outputs a light reception signal; a synchronous detection unit that detects existence/non-existence of the pulsed light by detecting existence/non-existence of the light reception signal which is synchronous with light emitting drive timing in a synchronous detection period which is defined by the light emitting drive timing of the light emitting element in a detection period, a first determination unit that determines that a value of the light reception signal exceeds a predetermined first threshold; a second determination unit that determines that the value of the light reception signal becomes less than a predetermined second threshold; a non-synchronous detection unit that detects existence of the light reception signal which is not synchronous with the light emitting drive timing in at least one of a case where it is determined that the value of the light reception signal exceeds the predetermined first threshold and a case where the value of the light reception signal becomes less than the predetermined second threshold in a non-synchronous detection period except the synchronous detection period in the detection period; and a detection result maintaining unit that, in a case where existence of the light reception signal which is not synchronous with the light emitting drive timing is detected by the non-synchronous detection unit, maintains a result of the detection of the existence/non-existence of the light reception signal by the synchronous detection unit in a subsequent detection period.

Advantageous Effects of Invention

According to an aspect of the present invention, there is an advantage in that AC light noise such as inverter fluorescent light and the other disturbance noise are distinguished, and an appropriate detection result is output in accordance with a state of the disturbance noise.

DESCRIPTION OF EMBODIMENTS

[Embodiment 1]

Embodiment 1 of the present invention will be described with reference to FIGS. 1 and 2 as follows.

Figure 1:
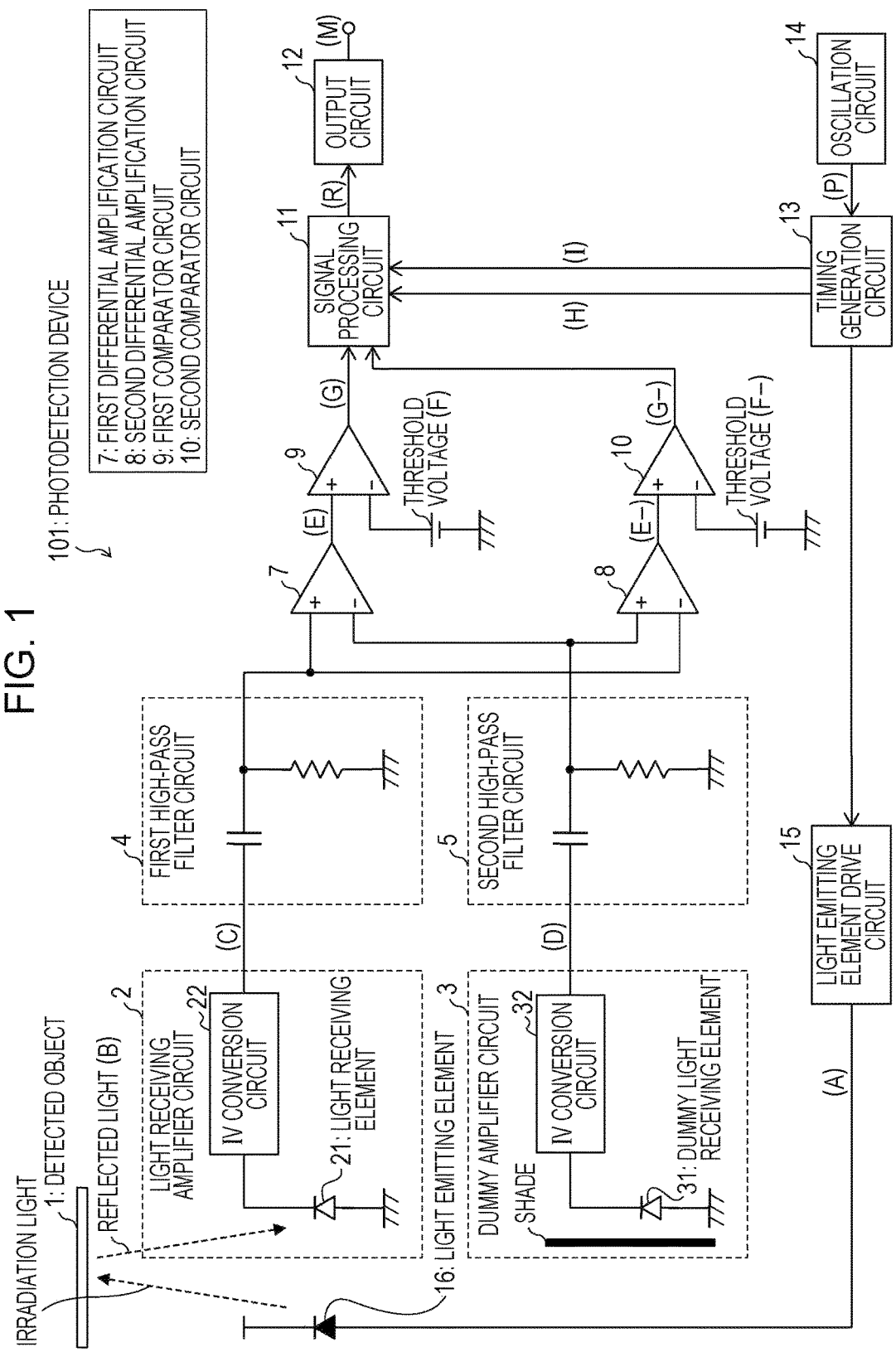
FIG. 1 is a block diagram illustrating a configuration of a photodetection device according to Embodiment 1 of the present invention.

FIG. 1 is a block diagram illustrating a configuration of a photodetection device according to Embodiment 1 of the present invention.

<Configuration of Photodetection Device 101>

As illustrated in FIG. 1, a photodetection device 101 includes a light receiving amplifier circuit 2, a dummy amplifier circuit 3, a first high-pass filter circuit 4, a second high-pass filter circuit 5, a first differential amplification circuit 7, a second differential amplification circuit 8, a first comparator circuit 9, a second comparator circuit 10, a signal processing circuit 11, an output circuit 12, a timing generation circuit 13, an oscillation circuit 14, a light emitting element drive circuit 15, and a light emitting element 16.

The light receiving amplifier circuit 2 includes a light receiving element 21, which includes a photodiode or the like, and an IV conversion circuit 22. In addition, the dummy amplifier circuit 3 includes a dummy light receiving element 31 and an IV conversion circuit 32. The light emitting element 16 irradiates a detected object 1 with pulsed light, the light receiving element 21 receives reflected light (B), which is reflected from the detected object 1, and outputs a current pulse signal. In the dummy light receiving element 31, light receiving surface is shaded by metal wirings or the like. The IV conversion circuits 22 and 32 are circuits such as transformer impedance amplifiers which respectively convert light current of the light receiving element 21 and the light current of the dummy light receiving element 31 into voltages and have the same circuit configuration.

In the embodiment, the photodetection device 101 will be described which detects existence/non-existence of the detected object 1 based on the reflected light of light, with which the detected object 1 is irradiated, from the detected object 1. However, the photodetection device 101 is not limited to the embodiment, and the photodetection device 101 may have a configuration in which existence/non-existence of the detected object 1 is sensed based on whether or not light from the light emitting element 16 and transmitted through the detected object 1 is received by the light receiving element 21.

The photodetection device 101 detects the existence/non-existence of the detected object 1 based on existence/non-existence of the current pulse signal which is generated when the light receiving element 21 receives reflected light of the pulsed light, which is emitted to the detected object 1 by the light emitting element 16 when the light emitting element 16 is driven in pulses by the light emitting element drive circuit 15. Therefore, an output terminal of the light receiving amplifier circuit 2 is connected to a positive input terminal of the first differential amplification circuit 7 and a negative input terminal of the second differential amplification circuit 8 through the first high-pass filter circuit 4, and an output terminal of the dummy amplifier circuit 3 is connected to a negative input terminal of the first differential amplification circuit 7 and a positive input terminal of the second differential amplification circuit 8 through the second high-pass filter circuit 5. In addition, an output terminal of the first differential amplification circuit 7 is connected to a positive input terminal of the first comparator circuit 9, and an output terminal of the second differential amplification circuit 8 is connected to a positive input terminal of the second comparator circuit 10. A threshold voltage (F) (first threshold) is input to a negative input terminal of the first comparator circuit 9. In contrast, a threshold voltage (F−) (second threshold) is input to a negative input terminal of the second comparator circuit 10. The signal processing circuit 11 determines the existence/non-existence of the detected object by performing signal processing using a gate signal which is generated by the timing generation circuit 13.

<Light Receiving Element 21 and Dummy Light Receiving Element 31>

In order to match impedance of the light receiving amplifier circuit 2 with impedance of the dummy amplifier circuit 3, the light receiving element 21 and the dummy light receiving element 31 are provided to have the same structure and the same area except a fact that the dummy light receiving element 31 is shaded. In addition, there is a case where a capacitive element is provided instead of the dummy light receiving element 31. In this case, in order to match the impedance of the light receiving amplifier circuit 2 with the impedance of the dummy amplifier circuit 3, a capacitance value of the capacitive element is set to be equal to a parasitic capacitance value of the light receiving element 21.

<First High-Pass Filter Circuit 4 and Second High-Pass Filter Circuit 5>

The first high-pass filter circuit 4 and the second high-pass filter circuit 5 are formed to have the same structure. Since a differential configuration is employed using the first differential amplification circuit 7 and the second differential amplification circuit 8, in a case where disturbance light noise of DC light such as sunlight or incandescent light is incident on the light receiving element 21, DC current flows only on a light receiving amplifier circuit 2 side, and thus a DC voltage which appears in an output terminal of the IV conversion circuit rises. Therefore, difference between an output bias voltage (DC voltage) of the light receiving amplifier circuit 2 and an output bias voltage (DC voltage) of the dummy amplifier circuit 3 markedly appears.

The output terminal of the light receiving amplifier circuit 2 is AC-connected to the first differential amplification circuit 7 through the first high-pass filter circuit 4, the output terminal of the dummy amplifier circuit 3 is AC-connected to the second differential amplification circuit 8 through the second high-pass filter circuit 5. In addition, in order to realize DC light cancellation with high accuracy, there is a case where the DC light canceling function-added IV conversion circuits 22 and 32 are used.

<First Differential Amplification Circuit 7 and Second Differential Amplification Circuit 8>

In a case where an output (light receiving amplifier output (C)) of the light receiving amplifier circuit 2 has a positive-side value with respect to an output (dummy amplifier output (D)) of the dummy amplifier circuit 3, the first differential amplification circuit 7 amplifies a positive difference voltage (first differential amplification circuit output (E): light reception signal). In a case where the light receiving amplifier output (C) has a negative-side value with respect to the dummy amplifier output (D), the second differential amplification circuit 8 amplifies a negative difference voltage (second differential amplification circuit output (E−): light reception signal).

<First Comparator Circuit 9 and Second Comparator Circuit 10>

The first comparator circuit 9 (first determination unit) compares the first differential amplification circuit output (F) with a predetermined threshold voltage (F), and outputs a result of comparison as a binary signal (first comparator output (G)). The second comparator circuit 10 (second determination unit) compares the second differential amplification circuit output (E−) with the predetermined threshold voltage (F−), and outputs a result of comparison as a binary signal (second comparator output (G−)).

<Light Emitting Element Drive Circuit 15>

The light emitting element drive circuit 15 generates a drive signal (light emitting element drive pulse (A)) in order to cause the light emitting element 16 to emit pulsed light based on a pulse signal supplied from the timing generation circuit 13. The light emitting element drive pulse (A) has predetermined light emitting drive timing (see FIG. 3).

<Timing Generation Circuit 13 and Oscillation Circuit 14>

The oscillation circuit 14 is a circuit that generates a clock signal (P) which is used in the timing generation circuit 13.

The timing generation circuit 13 is composed of a logical circuit, and generates various types of timing signals based on the output (clock (P)) of the oscillation circuit 14. Specifically, the timing generation circuit 13 generates a measurement cycle (cycle of light emitting, detection, output, or the like), the pulse signal to be given to the light emitting element drive circuit 15, a reset signal (L) which initializes each circuit element, and the like. In addition, the timing generation circuit 13 generates a gate signal (synchronous detection gate signal (H) or non-synchronous detection gate signal (I)) which is synchronous or non-synchronous with the light emitting pulse for synchronous or non-synchronous detection. The synchronous detection gate signal (H) is a pulse signal which is synchronous with light emitting timing of the light emitting element 16. The non-synchronous detection gate signal (I) is a pulse signal which is output in a period except that the synchronous detection gate signal (H) is output. A pulse width of the synchronous detection gate signal (H) defines a synchronous light sensing period (synchronous detection period) in which the pulsed light is detected, and a pulse width of the non-synchronous detection gate signal (I) defines a non-synchronous light sensing period (non-synchronous detection period), in which disturbance light other than the pulsed light is detected in a period other than the synchronous detection period.

<Signal Processing Circuit 11>

Figure 2:
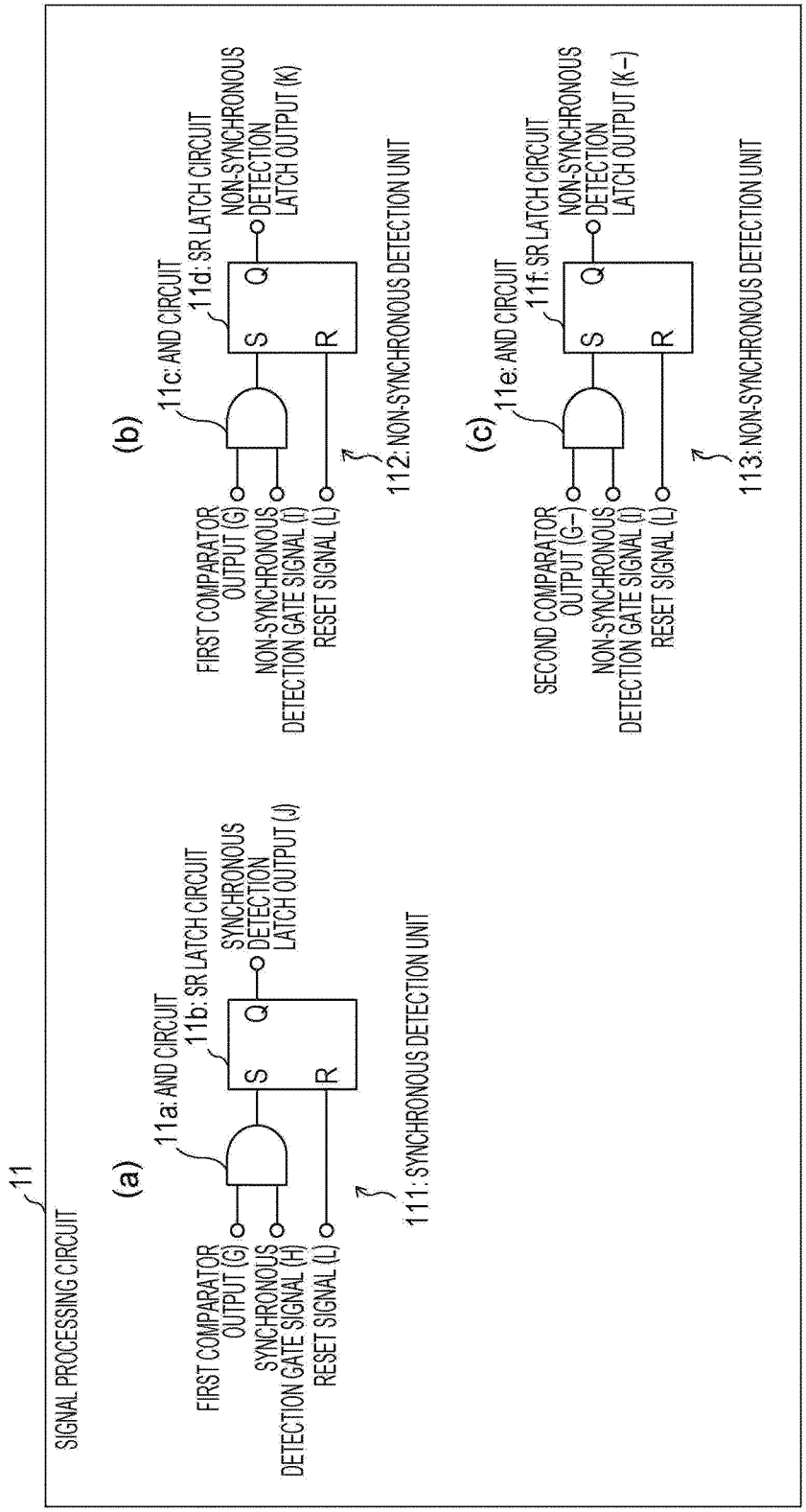
FIG. 2 is a logical circuit diagram illustrating a configuration of a signal processing circuit in the photodetection device.

(a) to (c) of FIG. 2 are logical circuit diagrams illustrating a configuration of the signal processing circuit 11 in the photodetection device 101.

As illustrated in (a) of FIG. 2, the signal processing circuit 11 includes an AND circuit 11*a* and an SR latch circuit 11*b* as a synchronous detection unit 111 for synchronous detection. An output (first comparator output (G)) of the first comparator circuit 9 is input to one input terminal of the AND circuit 11*a*, and the synchronous detection gate signal (H) is input to another input terminal of the AND circuit 11*a*.

An output terminal of the AND circuit 11*a* is connected to the S input terminal SET of the SR latch circuit 11*b*, and the reset signal (L) is input to an R input terminal RESET. A synchronous detection latch output (J) is output from an output terminal Q of the SR latch circuit 11*b*.

In addition, the signal processing circuit 11 has an AND circuit 11*c* and an SR latch circuit 11*d* as a positive-side non-synchronous detection unit 112, and has an AND circuit 11*e* and an SR latch circuit 11*f* as a negative-side non-synchronous detection unit 113. The first comparator output (G) and the non-synchronous detection gate signal (I) are input to the AND circuit 11*c*. The second comparator output (G−) and the non-synchronous detection gate signal (I) are input to the AND circuit 11*e*. A connection configuration of the AND circuit 11*c* and the SR latch circuit 11*d* and a connection configuration of the AND circuit 11*e* and the SR latch circuit 11*f* are the same as a connection configuration of the AND circuit 11*a* and the SR latch circuit 11*b*. Therefore, description thereof will not be repeated here. A +non-synchronous detection latch output (K) is output from the output terminal Q of the SR latch circuit 11*d*, and a −non-synchronous detection latch output (K−) is output for the output terminal Q of the SR latch circuit 11*f*.

<Operation of Photodetection Device 101>

The photodetection device 101, which is configured as described above, operates as below.

Here, an operation of the photodetection device 101 will be described using FIG. 3 (first cycle) referred to in Embodiment 2 which will be described later. The first cycle in FIG. 3 illustrates waveforms in a state in which the detected object 1 exists.

Figure 3:
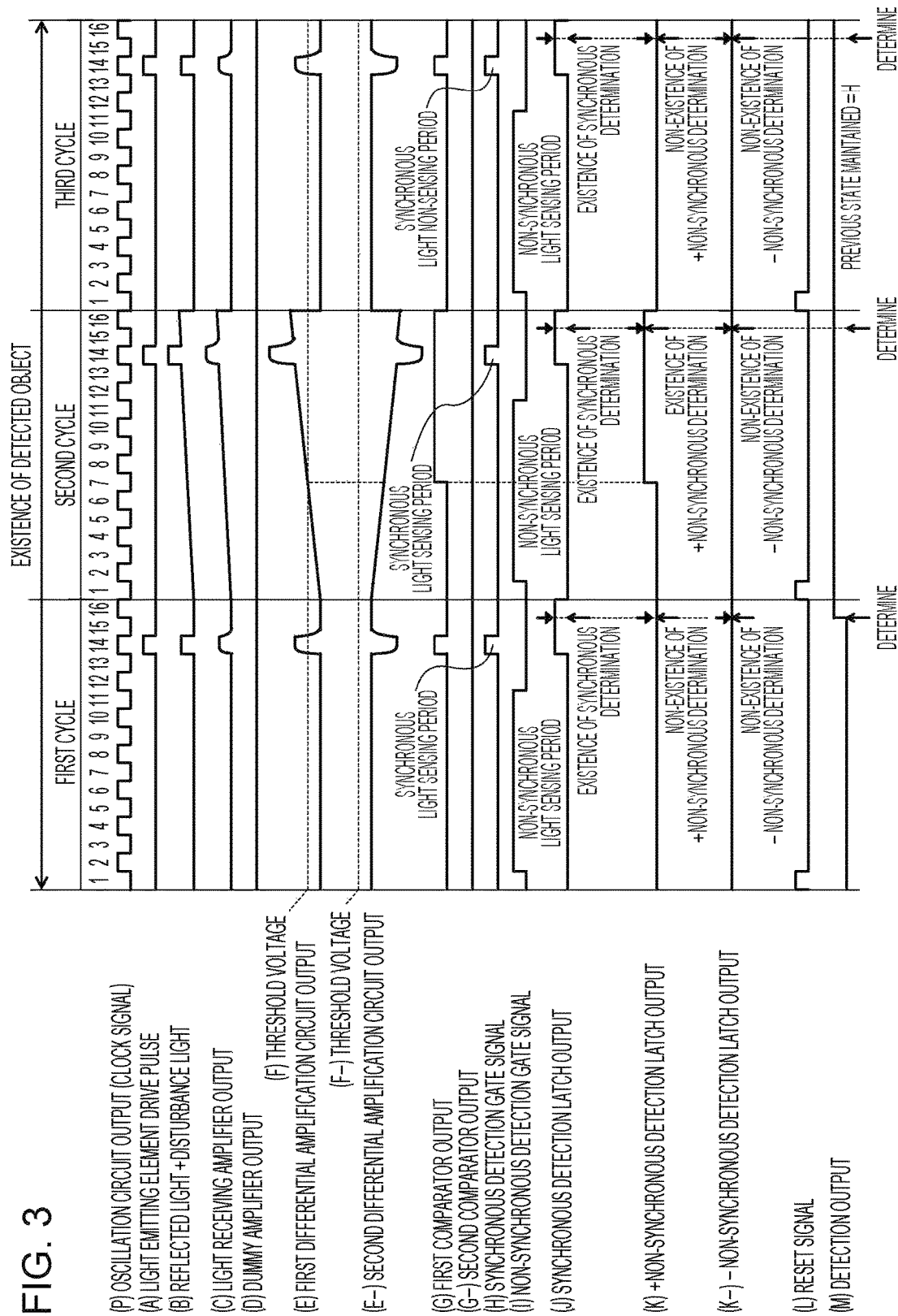
FIG. 3 is a waveform chart illustrating operational waveforms of the photodetection device in a case where increasing disturbance noise is input according to Embodiment 2 of the present invention.

As illustrated in FIG. 3, first, the light emitting element 16 emits pulsed light by being driven in pulses by the light emitting element drive circuit 15 based on the light emitting element drive pulse (A). In a case where the reflected light (B), which is the pulsed light emitted from the light emitting element 16 and is reflected in the detected object 1, reaches the light receiving surface of the light receiving element 21, the light receiving element 21 generates the current pulse signal. The IV conversion circuit 22 converts the current pulse signal into voltage pulse signal. Therefore, the light receiving amplifier output (C) is output from the light receiving amplifier circuit 2. The light receiving amplifier output (C) is input to the first differential amplification circuit 7 through the first high-pass filter circuit 4.

In contrast, since the dummy light receiving element 31 is shaded, the dummy light receiving element 31 does not output the current pulse signal unlike the light emitting element 16. Therefore, the output (dummy amplifier output (D)) of the dummy amplifier circuit 3 is at 0 level. The dummy amplifier output (D) is input to the first differential amplification circuit 7 through the second high-pass filter circuit 5.

Since the light receiving amplifier output (C) is the positive-side value with respect to the dummy amplifier output (D), the first differential amplification circuit 7 amplifies a difference voltage ((C)−(D)) (positive value) between the light receiving amplifier output (C) and the dummy amplifier output (D), and outputs the amplified difference voltage as the voltage pulse signal (first differential amplification circuit output (E)). Since the light receiving amplifier output (C) is a positive-side value with respect to the dummy amplifier output (D), the second differential amplification circuit 8 amplifies a difference voltage ((D)−(C)) (negative value) between the light receiving amplifier output (C) and the dummy amplifier output (D), and outputs the amplified difference voltage as the voltage pulse signal (second differential amplification circuit output (E−)).

As described above, in a case where differential amplification is performed on the light receiving amplifier output (C) and the dummy amplifier output (D), high frequency noise or the like, which is superimposed in phase on respective signal lines of the light receiving amplifier circuit 2 and the dummy amplifier circuit 3, is offset from the power supply line and then removed. Therefore, a malfunction of the photodetection device 101 due to superimposition or the like of the power supply line noise is suppressed. Furthermore, even with the differential configuration, reflected light is not incident on the light receiving surface of the dummy light receiving element 31, and thus normal pulse signal is not reduced.

The first comparator circuit 9 compares the first differential amplification circuit output (E) with the threshold voltage (F). Since the first differential amplification circuit output (E) exceeds the threshold voltage (F), the pulse signal (first comparator output (G)) is output. The second comparator circuit 10 compares the second differential amplification circuit output (E−) with the threshold voltage (F−). Since the second differential amplification circuit output (E−) does not exceed the threshold voltage (F−), the pulse signal is not output (second comparator output (G−)).

As illustrated in (a) of FIG. 2, in the signal processing circuit 11, in a case where the first comparator output (G), which is synchronous with the synchronous detection gate signal (H), is input, the AND circuit 11a changes the output into a high level (H level). Therefore, until the SR latch circuit 11b is reset by the reset signal (L), the SR latch circuit 11b outputs the synchronous detection latch output (J) at the high level (synchronous light detection). In addition, in the signal processing circuit 11, the existence/non-existence of the detected object is determined based on the synchronous detection latch output (J) at any timing (for example, indicated by a downward arrow in FIG. 3). Specifically, in a case where the synchronous detection latch output (J) is at the high level, it is determined to be the "existence of the detected object", and thus the detection output (M) is set to the high level and a high-level value is maintained. In contrast, in a case where the synchronous detection latch output (J) is at a low level (L level), it is determined to be the "non-existence of the detected object", and thus the detection output (M) is set to the low level and a low-level value is maintained.

In the example of the operation, setting is performed such that it is determined to be the "existence of the detected object" in a case where the detection output (M) is at the high level and it is determined to be the "non-existence of the detected object in a case where the detection output (M) is at the low level. In contrast, it is apparent that setting may be performed such that it is determined to be the "existence of the detected object" in a case where the detection output (M) is at the low level and it is determined to be the "non-existence of the detected object in a case where the detection output (M) is at the high level.

In this manner, in a case where the detected object 1 exists, it is determined to be the "existence of the detected object" based on a result of reception of the reflected light (B). In a case where the detected object 1 does not exist, the light receiving amplifier output (C) is not output. Therefore, the first comparator output (G) is not output, and thus the SR latch circuit 11b does not output the synchronous detection latch output (J).

In addition, in a case where high disturbance light noise resistance or high power supply line noise resistance is desired, it is detected whether or not the first comparator output (G) or the second comparator output (G−) is output (non-synchronous light detection) at timing other than the light emitting element drive pulse (A) (synchronous detection gate signal (H)) in the signal processing circuit 11. Specifically, in a case where the first comparator output (G) coincides with the non-synchronous detection gate signal (I) at the high level, the signal processing circuit 11 outputs the +non-synchronous detection latch output (K) using the non-synchronous detection unit 112 illustrated in (b) of FIG. 2. In contrast, in a case where the second comparator output (G−) coincides with the non-synchronous detection gate signal (I) at the high level, the signal processing circuit 11 outputs the −non-synchronous detection latch output (K−) using the non-synchronous detection unit 113 illustrated in (c) of FIG. 2. As described above, there is a case where the existence/non-existence or the like of the detected object 1 is determined through combination of a result of synchronous light detection and a result of non-synchronous light detection. For example, in a case where both the synchronous light and the non-synchronous light are detected, the signal processing circuit 11 (detection result maintaining unit) performs a process of maintaining a result of previous detection or forcedly releasing the maintaining of the result of detection in accordance with the type of the disturbance light. The process will be described in detail in Embodiments 2 to 4 which will be described later.

A result of determination acquired in the signal processing circuit 11 is output as the result of determination including detection or non-detection to the external output terminal through the output circuit 12, or is preserved in a register circuit, a memory element, or the like which is mounted inside the photodetection device 101. In a latter case, the photodetection device 101 includes a communication interface, such as an I2C bus, inside the photodetection device 101 in order to fetch the result of determination preserved inside the photodetection device 101 from the electronic apparatus (host system), or controls a circuit operation.

<Advantage of Photodetection Device 101>

The photodetection device 101 according to the embodiment includes the first differential amplification circuit 7 and the first comparator circuit 9. Therefore, the first comparator circuit 9 determines whether or not the light reception signal from the first differential amplification circuit 7 exceeds the threshold voltage (F). In addition, the photodetection device 101 includes the second differential amplification circuit 8 and the second comparator circuit 10. Therefore, the second comparator circuit 10 determines whether or not the inverted light reception signal from the second differential amplification circuit 8 exceeds the threshold voltage (F−). Here, the light reception signal is inverted, and thus, substantially, it is determined whether or not the light reception signal is lower than the threshold voltage (F−).

In a case where the non-synchronous detection unit 112 or 113 is operated based on the result of determination, it is possible to detect DC light as the disturbance light, and, in a case where the non-synchronous detection units 112 and the 113 are operated, it is possible to detect AC light noise as the disturbance light. Therefore, it is possible to distinguish and detect different types of disturbance light as the DC light and the AC light noise. Therefore, it is possible to appropriately perform photodetection in accordance with each state of disturbance noise.

[Embodiment 2]

Embodiment 2 of the present invention will be described with reference to FIGS. 3 and 4 as below. For convenience of description, the same reference symbols are attached to components which have the same functions as the components described in Embodiment 1, and the description thereof will not be repeated.

In the embodiment, an example of an operation of the above-described photodetection device 101, which is performed in cases where the disturbance noise increases and the disturbance noise is reduced, will be described.

<Operation in Case Where Disturbance Noise Increases>

Figure 11:
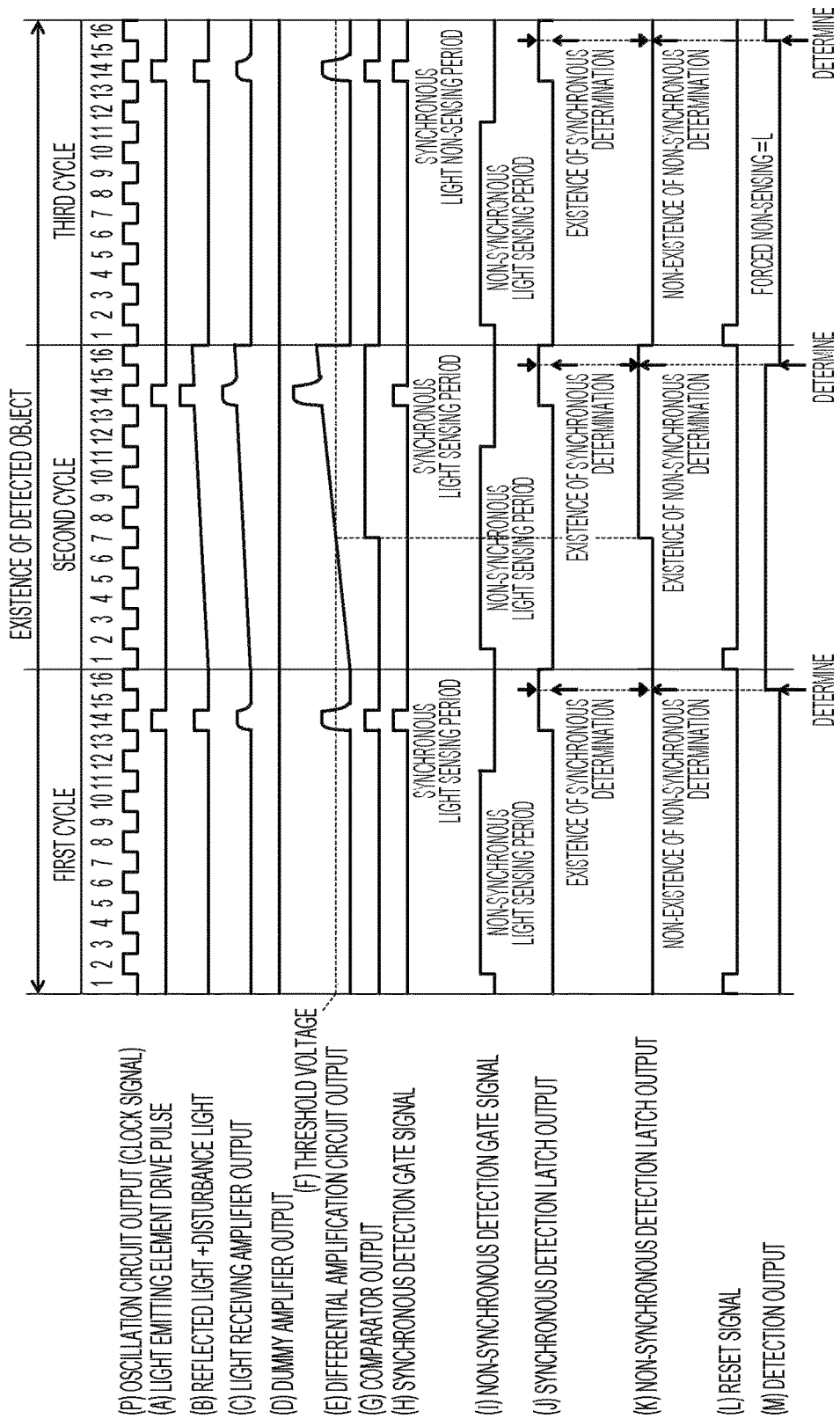
FIG. 11 is a waveform chart illustrating operational waveforms in a case where the disturbance noise of the photodetection device in FIG. 8 is input.

FIG. 3 illustrates an example of operational waveforms of the above-described photodetection device 101 in a case where incident disturbance light increases. Specifically, FIG. 3 illustrates waveforms in a state in which the detected object 1 exists in all the three cycles corresponding to the measurement period (detection period) and the disturbance light increases only in a second cycle, similarly to FIG. 11.

As illustrated in FIG. 3, all the three cycles are in a state in which the detected object 1 exists, and thus a result of determination, in which the detection output (M) becomes the high level (detection) in the first cycle and the detection state continues after the first cycle, is desirable. In the second cycle, the disturbance light linearly increases. Therefore, in a case where the first differential amplification circuit output (E) exceeds the threshold voltage (F) in the non-synchronous light sensing period, a pulse signal is output as the first comparator output (G) in the non-synchronous light sensing period.

In the signal processing circuit 11, it is determined whether or not a logical level of the pulse signal of the first comparator output (G) coincides with a logical level of the non-synchronous detection gate signal (I) using the AND circuit 11c and the SR latch circuit 11d. In this case, since both the logical levels coincide, the +non-synchronous detection latch output (K) is inverted to the high level in the SR latch circuit 11d, and a positive-side non-synchronous light is detected. In contrast, the second differential amplification circuit output (E−) does not exceed the threshold voltage (F−) in the whole period illustrated in FIG. 3. Therefore, the pulse signal is not output as the second comparator output (G−) even in the non-synchronous light sensing period, and thus a logical level of the second comparator output (G−) does not coincide with the logical level of the non-synchronous detection gate signal (I). Therefore, the −non-synchronous detection latch output (K−) is maintained at low level and a negative-side non-synchronous light is not detected.

In a case where the +non-synchronous detection latch output (K) is inverted to the high level and the −non-synchronous detection latch output (K) is maintained at the low level as in the second cycle, a process of maintaining the detection output (M) in a state of a previous cycle is performed. In this example, it is determined to be the "existence of the detected object" in the first cycle, with the result that the detection output (M) is set to the high level, and thus the high level is also maintained in the second cycle.

Figure 12:
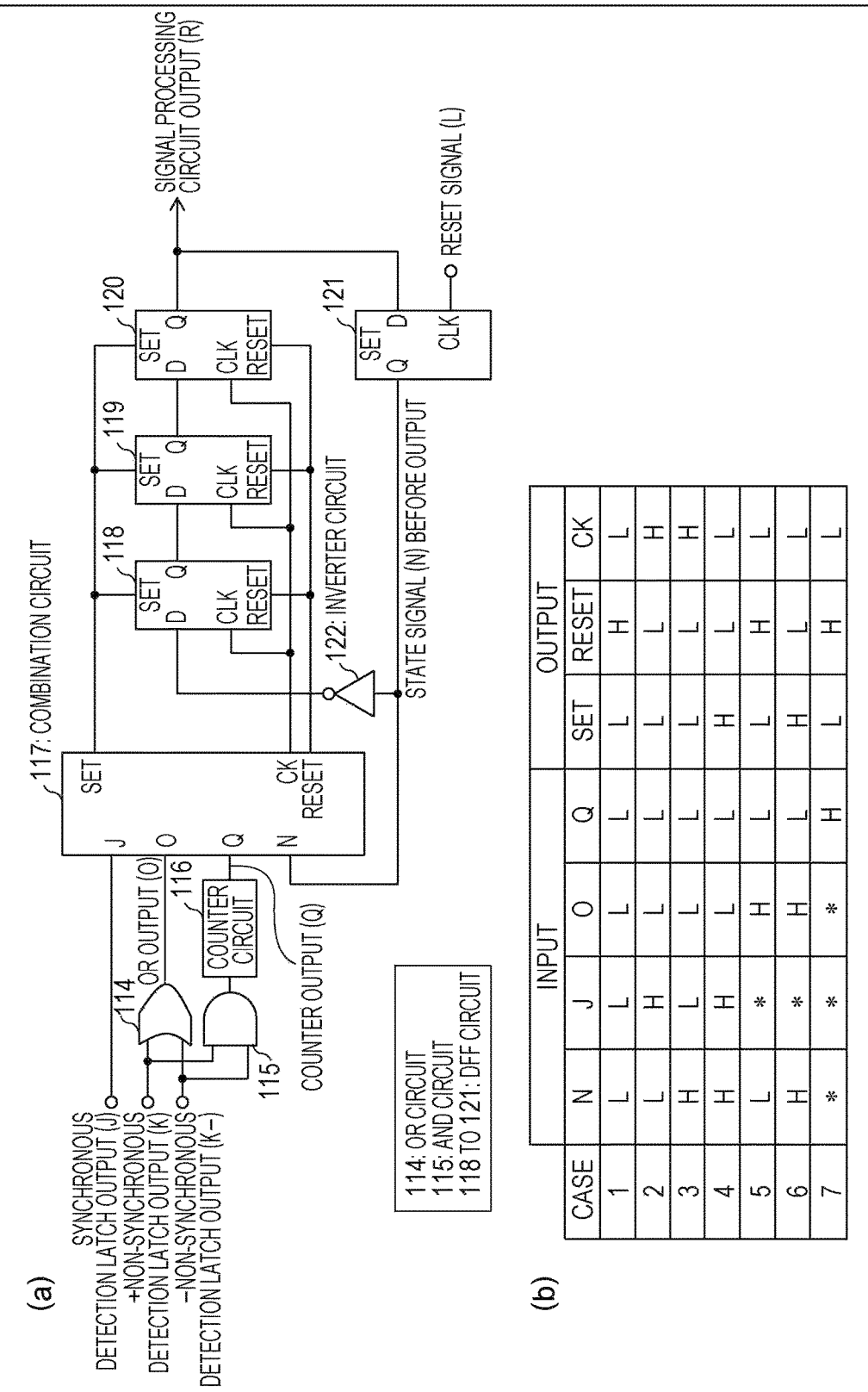
FIG. 12(a) is a logical circuit diagram illustrating a detailed configuration which realizes a signal processing logic of the signal processing circuit in the photodetection device according to Embodiment 4.
FIG. 12(b) is a truth table illustrating an operation of a combination circuit in the configuration.

As described above, in a case where any one of the positive-side non-synchronous light and the negative-side non-synchronous light is detected and a signal processing logic for the detection output (M) is such that the state of the previous cycle is maintained in the signal processing circuit 11, it is possible to maintain the state before output in a case where the disturbance light monotonically increases. In this example, the detected object 1 is in a state of being sensed by the photodetection device 101, and thus determination of the "existence of the detected object" is ideally maintained. A configuration to perform setting as described above will be described in Embodiment 4, which will be described later, with reference to FIG. 12.

In addition, although not illustrated in the drawing, in a case where the disturbance light increases similarly to the above-described example in the state of non-existence of the detected object, there is a possibility that the first comparator output (G) becomes the high level at timing of the synchronous detection gate signal (H) and it is determined to be the "existence of the detected object" from the synchronous detection latch output (J) regardless of the detected object 1 not existing. In contrast, with the above-described signal processing logic, the state of the previous cycle (non-existence of the detected object) is output as the detection output (M), and thus a disadvantage of erroneous detection is not generated.

<Operation in Case Where Disturbance Noise Decreases>

Figure 4:
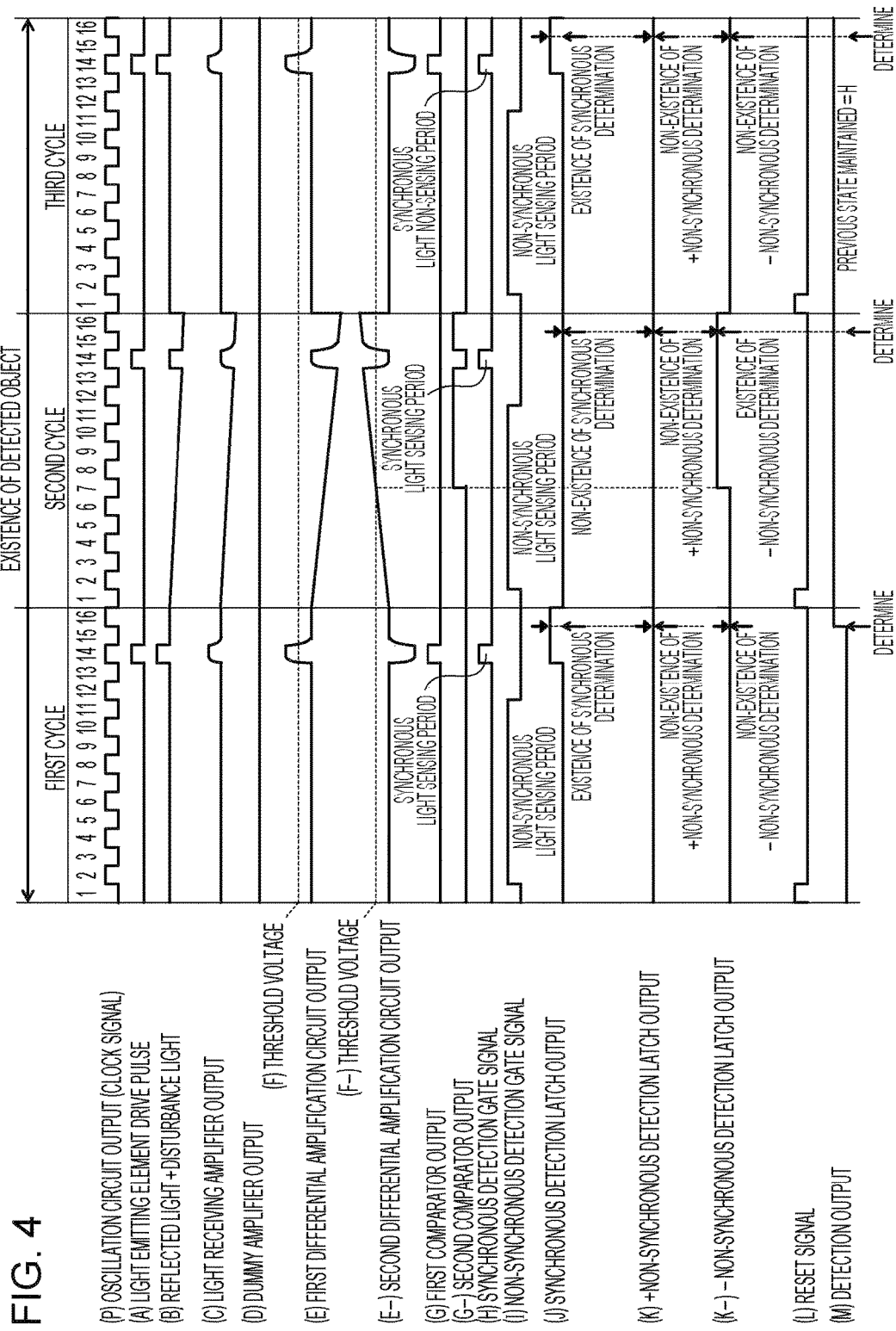
FIG. 4 is a waveform chart illustrating operational waveforms of the photodetection device in a case where reducing disturbance noise is input according to Embodiment 2 of the present invention.

FIG. 4 illustrates an example of operational waveforms of the above-described photodetection device 101 in a case where incident disturbance light decreases. Specifically, FIG. 4 illustrates waveforms in a case where all the three cycles corresponding to the measurement period are in the state in which the detected object 1 exists and the disturbance light decreases only in the second cycle.

As illustrated in FIG. 4, since the disturbance light linearly decreases in the second cycle, the first differential amplification circuit output (E) does not exceed the threshold voltage (F) in the non-synchronous light sensing period of the second cycle. Therefore, the pulse signal is not output as the first comparator output (G) in the synchronous light detection period. Therefore, the +non-synchronous detection latch output (K) is maintained at the low level, and thus the positive-side non-synchronous light is not detected and the synchronous light is not detected.

In contrast, in a case where the second differential amplification circuit output (E−) exceeds the threshold voltage (F) in the non-synchronous light sensing period of the second cycle, the pulse signal is output as the second comparator output (G−) in the non-synchronous light sensing period. In the signal processing circuit 11, it is determined whether or not the logical level of the second comparator output (G−) coincides with the logical level of the non-synchronous detection gate signal (I). In this case, since both the logical levels coincide with each other, the −non-synchronous detection latch output (K) is inverted to the high level and the negative-side non-synchronous light is detected.

As described above, in a case where any one of the positive-side non-synchronous light and the negative-side non-synchronous light is detected and the signal processing logic of the detection output (M) is set such that the state of the previous cycle is maintained in the signal processing circuit 11, the state of the previous cycle is maintained in the second cycle, and thus it is possible to avoid a disadvantage of pulse omission in which the synchronous light is not detected in the second cycle and the detection output (M) becomes the low level. A configuration to perform setting as described above will be described in Embodiment 4, which will be described later, with reference to FIG. 12.

In this embodiment and Embodiments 3 and 4 which will be described later, the threshold voltages (F) and (F−) as determination references for detection of the synchronous light and the non-synchronous light are set to be a fixed value. However, it is possible to increase resistance to a malfunction by appropriately setting the respective threshold voltages (F) and (F−) as occasion demands.

In addition, in this embodiment and Embodiments 3 and 4 which will be described later, an example is described in which the synchronous-light-pulse-detection photodetection device 101 is premised. It is possible to apply a technique of performing signal processing on the positive and negative comparator outputs (G) and (G−) and avoiding a malfunction with respect to the disturbance noise, to a photodetection device in addition to the synchronous photodetection device.

[Embodiment 3]

Embodiment 3 of the present invention will be described with reference to FIG. 5 as below. For convenience of description, the same reference symbols are attached to components which have the same functions as the components described in Embodiment 1, and the description thereof will not be repeated.

In this embodiment, an example of an operation, which is performed in a case where the disturbance noise fluctuates in a short range in the AC manner in the above-described photodetection device 101, will be described. Specifically, in the embodiment, a case is assumed where the disturbance light is singly incident in a short time range in the AC manner. However, a case where a potential of the power supply line fluctuates due to electrical single noise, such as ESD application and the disturbance noise is applied to the light receiving amplifier output (C) in the AC manner in the short time range may be included as the same situation.

Figure 5:
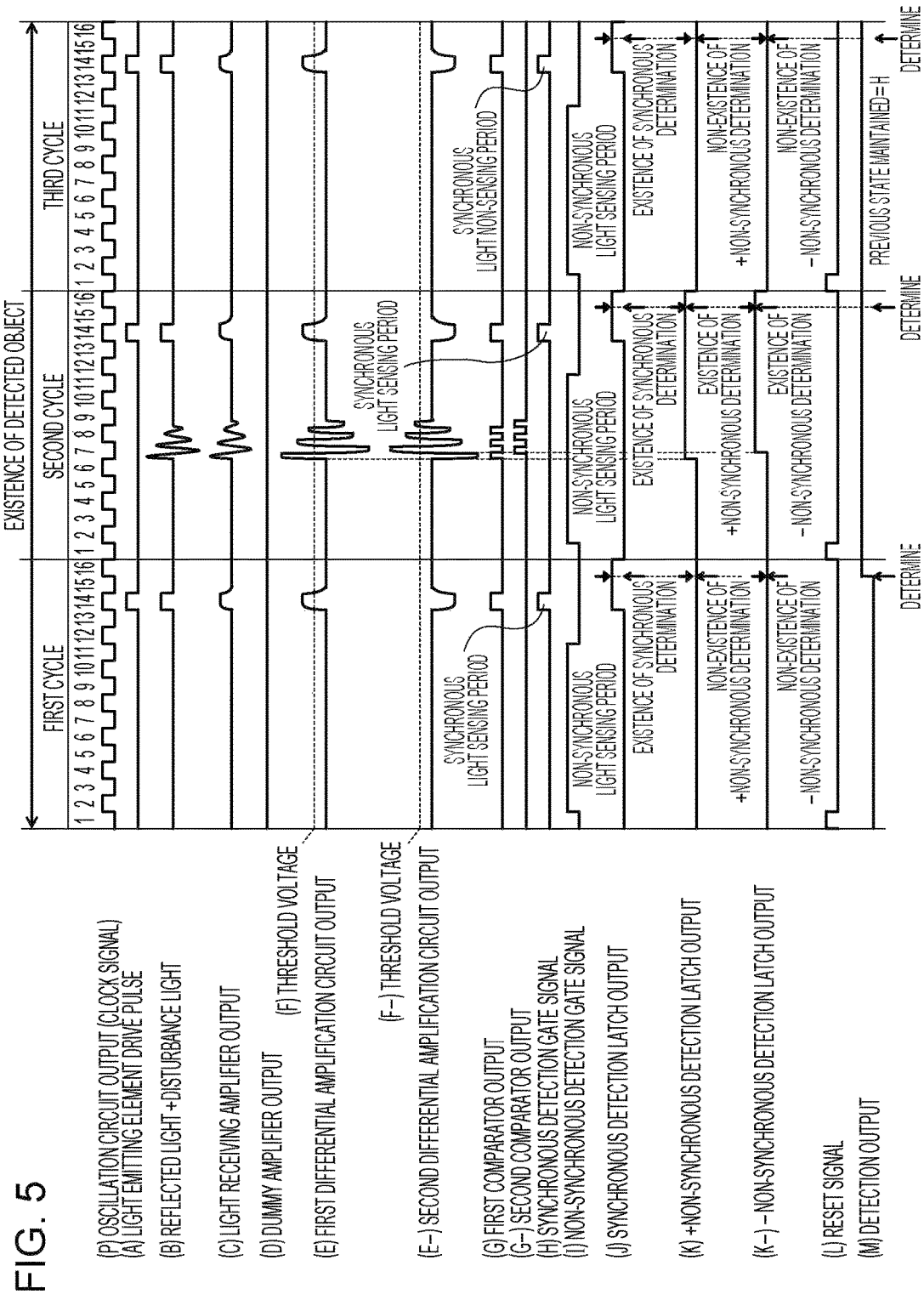
FIG. 5 is a waveform chart illustrating operational waveforms of the photodetection device in a case where disturbance noise which fluctuates in a short period is input according to Embodiment 3 of the present invention.

FIG. 5 is a waveform chart illustrating operational waveforms of the photodetection device 101 in a case where the disturbance noise which fluctuates in a short period is input. Specifically, FIG. 5 illustrates the waveforms in a case where the detected object 1 exists in all the three cycles corresponding to the measurement period and the disturbance light fluctuates only in the second cycle.

As illustrated in FIG. 5, the disturbance light is incident in the AC manner in the non-synchronous light sensing period of the second cycle. Therefore, at timing in which the first differential amplification circuit output (E) and the second differential amplification circuit output (E−) respectively exceed the threshold voltage (F) and the threshold voltage (F−), the pulse signals are output for the first comparator output (G) and the second comparator output (G−), respectively. However, the first comparator output (G) and the second comparator output (G−) become the pulse signals in which phases are deviated from each other.

In the non-synchronous detection units 112 and 113 of the signal processing circuit 11, it is determined whether or not the logical level of the first comparator output (G) and the logical level of the second comparator output (G−) respectively coincide with the logical level of the non-synchronous detection gate signal (I). In this case, since the logical levels of both the comparator outputs (G) and (G−) coincide with the logical level of the non-synchronous detection gate signal (I), the +non-synchronous detection latch output (K) and the −non-synchronous detection latch output (K−) are inverted to the high level. Therefore, the non-synchronous light is detected in both the positive side and the negative side. In the embodiment, even in a case where the non-synchronous light is detected on both the positive side and the negative side at least once (singly) as in the second cycle, a process of maintaining the detection output (M) in the state of the previous cycle is performed. In addition, in the embodiment, it is determined to be the "existence of the detected object" in the first cycle and the detection output (M) is set to the high level, and thus the detection output (M) is maintained at the high level in the second cycle.

As described above, in a case where both the positive-side non-synchronous light and the negative-side non-synchronous light are singly detected only in the non-synchronous light sensing period of a certain cycle, the signal processing logic of the detection output (M) is set such that the state of the previous cycle is maintained in the signal processing circuit 11. Therefore, in a case where the disturbance noise is singly input in the short time range in the AC manner, it is possible to maintain the detection output (M) in the state of the previous cycle, thereby output determination being the same as in a state in which the disturbance noise does not exist. In the embodiment, the detected object 1 exists, and thus, ideally, the determination of the "existence of the detected object" is maintained. A configuration to perform setting as described above will be described in Embodiment 4, which will be described later, with reference to FIG. 12.

[Embodiment 4]

Embodiment 4 of the present invention will be described with reference to FIG. 6 as below. For convenience of description, the same reference symbols are attached to components which have the same functions as the components described in Embodiment 1, and the description thereof will not be repeated.

In this embodiment, unlike Embodiment 3, an example of an operation, which is performed by the above-described photodetection device 101 in a case where the disturbance noise fluctuates over a long period (two or more cycles), will be described. Specifically, in the embodiment, a case is assumed where the AC light noise such as inverter fluorescent light is continuously incident as the disturbance light.

Figure 6:
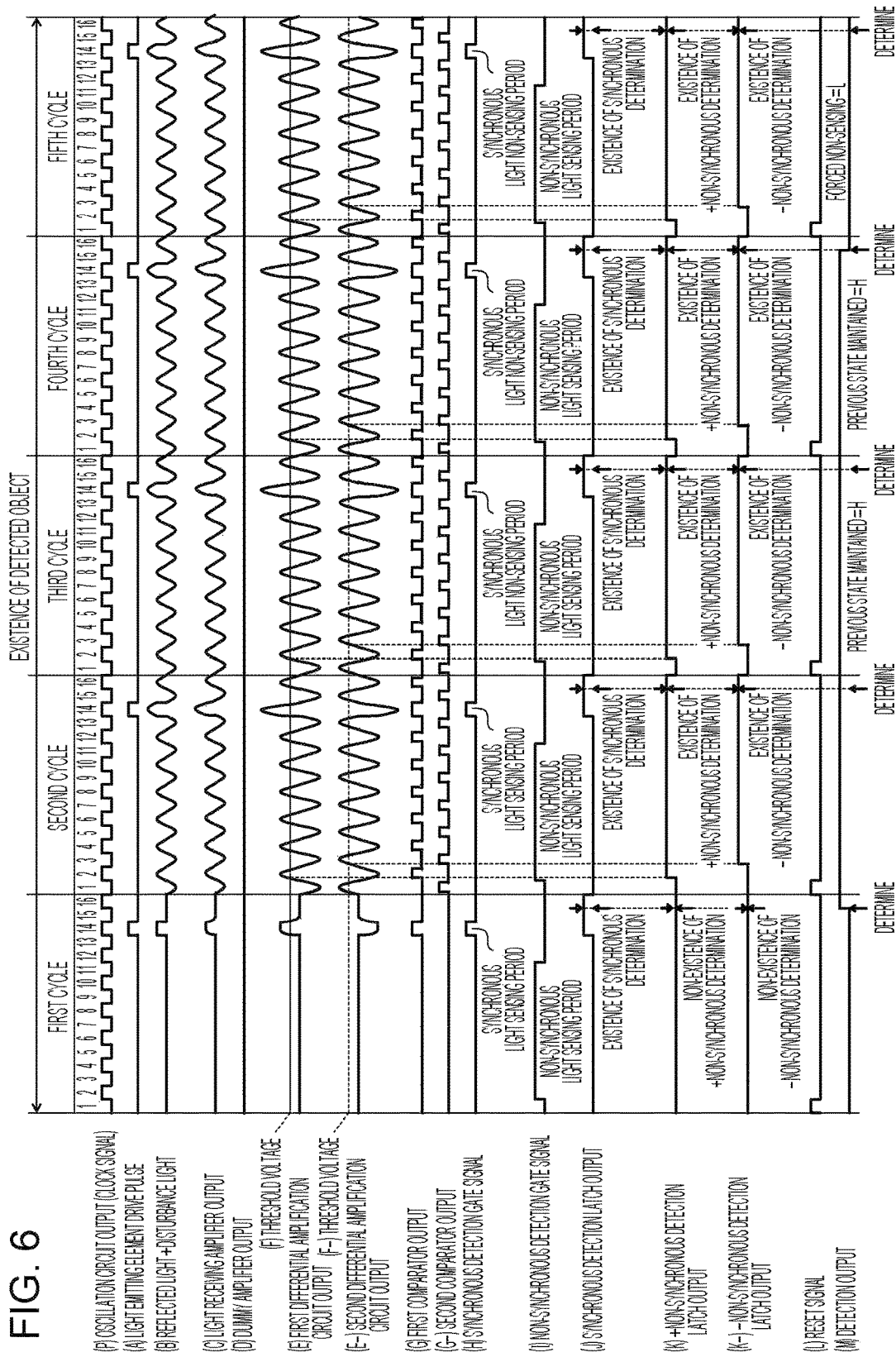
FIG. 6 is a waveform chart illustrating operational waveforms of the photodetection device in a case where disturbance noise which fluctuates in a long period is input according to Embodiment 4 of the present invention.

FIG. 6 is a waveform chart illustrating operational waveforms of the photodetection device 101 in a case where the disturbance noise which fluctuates in a long period is input. Specifically, FIG. 6 illustrates the waveforms in a case where the detected object exists in all five cycles corresponding to the measurement period and the AC light noise is input in the second cycle and subsequent cycles.

As illustrated in FIG. 6, the AC light noise is continuously input from the second cycle. Therefore, at timing in which the first differential amplification circuit output (E) and the second differential amplification circuit output (E−) respectively exceed the threshold voltage (F) and the threshold voltage (F−), the pulse signals are continuously output for the first comparator output (G) and the second comparator output (G−), respectively. However, the first comparator output (G) and the second comparator output (G−) become the pulse signals in which phases are deviated from each other.

In the non-synchronous detection units 112 and 113 of the signal processing circuit 11, it is determined whether or not the logical level of the first comparator output (G) and the logical level of the second comparator output (G−) respectively coincide with the logical level of the non-synchronous detection gate signal (I). In this case, since the logical levels of both the comparator outputs (G) and (G−) coincide with the logical level of the non-synchronous detection gate signal (I), the +non-synchronous detection latch output (K) and the −non-synchronous detection latch output (K−) are inverted to the high level. Therefore, the non-synchronous light is continuously (the second cycle to the fifth cycle) detected in both the positive side and the negative side.

In addition, in the embodiment, peaks of the reflected light (signal light) and the AC light noise on phase coincide with each other. Therefore, the pulse signal is output as the first comparator output (G) at synchronous detection timing, the synchronous detection latch output (J) normally at the high level at timing in which the existence/non-existence of the detected object 1 is determined, and thus it is determined to be "existence of synchronous light".

In a case where the non-synchronous light is continuously detected a plurality of times on both the positive side and the negative side, the signal processing circuit 11 performs a process such that the detection output (M) becomes forced non-detection (low level). In this embodiment, in a case where the non-synchronous light is continuously detected a plurality of times (here, three times) on both the positive side and the negative side, the signal processing circuit 11 causes the detection output (M) to be forcedly non-detected. Specifically, the signal processing circuit 11 maintains the detection output (M) as in the previous state (detection output (M)=high level) until the non-synchronous light is continuously detected two times on both the positive side and the negative side, and inverts the detection output (M) into the low level from determination timing in the fourth cycle. Therefore, forced non-detection, that is, non-existence of the light reception signal is determined.

In the signal processing logic in which the detection output (M) is maintained as in the previous state based on disturbance noise light detection, the determination of the "existence of the detected object" is maintained in a period in which the AC light noise is input regardless of the detected object 1 not existing. In contrast, in a case where the signal processing circuit 11 performs the signal processing as described above, it is possible to avoid fixedly performing erroneous detection.

In addition, a forced non-detection period may include a period in which detection of the non-synchronous light is continued on both the positive side and the negative side. Further, in a case where the forced non-detection is performed once, signal processing may be performed such that the forced non-detection is continued for certain time using a timer circuit which is provided in the signal processing circuit 11. In a configuration in which the forced non-detection is continued for certain time using the timer circuit, chattering in which the detection output (M) repeats the high level and the low level may be rarely generated in a case where the AC light noise is continuously input.

FIG. 12(a) is a logical circuit diagram illustrating a detailed configuration which realizes the signal processing logic of the forced non-detection in the signal processing circuit 11, and FIG. 12(b) is a truth table illustrating an operation of a combination circuit 117 in the configuration.

As illustrated in FIG. 12(a), the signal processing circuit 11 includes an AND circuit 114, an OR circuit 115, a counter circuit 116, the combination circuit 117, D flip-flop circuits (illustrated as "DFF circuits" in the drawing) 118 to 121, and an inverter circuit 122.

The +non-synchronous detection latch output (K) and the −non-synchronous detection latch output (K−) are input to two input terminals of each of the AND circuit 114 and the OR circuit 115. An output terminal of the AND circuit 114 is connected to an input terminal of the counter circuit 116. The synchronous detection latch output (J), an output (O) of the OR circuit 115, an output (counter output (Q)) of the counter circuit 116, and a state signal before output are input to the combination circuit 117. The state signal (N) before output a signal which indicates a state (logical level) of a cycle before detection output (M).

The counter circuit 116 is a counter circuit which outputs the counter output (Q) at the high level as a result acquired by counting the output of the AND circuit 114 in a case where a state, in which the output of the AND circuit 114 becomes the high level, is continuously detected a plurality of times. That is, the counter circuit 116 outputs at the high level in a case where the +non-synchronous detection lath output (K) and the −non-synchronous detection latch output (K−) are continuously become high level a plurality of times at timing in which the +non-synchronous detection latch output (K) and the −non-synchronous detection latch output (K−) are determined and in a case where the non-synchronous light is continuously detected a plurality of times on both the positive side and the negative side.

As illustrated in a truth table of FIG. 12(b), the combination circuit 117 outputs a SET signal, a RESET signal, and a CK signal with respect to the state signal (N) before output, the synchronous detection latch output (J), the OR output (O), and the counter output (Q) which are input. The SET signal, the RESET signal, and the CK signal are respectively input to a set terminal SET, a reset terminal RESET, and a clock terminal CLK of each of the D flip-flop circuits 118 to 120.

The SET/RESET attached D flip-flop circuits 118 to 120 in three stages are subordinately connected to each other. Specifically, an output terminal Q of the D flip-flop circuit 118 is connected to an input terminal D of the D flip-flop circuit 119, and an output terminal Q of the D flip-flop circuit 119 is connected to an input terminal D of the D flip-flop circuit 120. An output terminal Q of the D flip-flop circuit 120 is connected to an input terminal D of the D flip-flop circuit 121 and outputs the signal processing circuit output (R).

An output terminal Q of the D flip-flop circuit 121 outputs the state signal (N) before output, and is connected to the input terminal D of the D flip-flop circuit 118 through the inverter circuit 122. In addition, the reset signal (L) is input to a clock terminal CLK of the D flip-flop circuit 121.

CASEs 1 to 4 of the truth table indicate a case where the disturbance light does not exist. In CASE 1, the state signal (N) before output is at the low level (non-existence of the detected object), only the reset signal (RESET) is output at the high level in a case where the synchronous detection latch output (J) becomes the low level (non-existence of the detected object) in a subsequent cycle, the state signal (N) before output of the signal processing circuit 11 is maintained at the low level, and the detection output (M) is maintained at the low level (non-existence of the detected object).

In CASE 2, the state signal (N) before output is at the low level (non-existence of the detected object), and only the CK signal is output at the high level in a case where the synchronous detection latch output (J) is at the high level (existence of the detected object) in a subsequent cycle. Since the state signal (N) before output is input to the D flip-flop circuit 118 at the first stage through the inverter circuit 122, the high level is input to the D flip-flop circuit 118 at the first stage. In a case where CASE 2 is continued three times, the CK signal is input to the D flip-flop circuit 118 three times in the same manner, the signal processing circuit output (R) becomes the high level, and the detection output (M) is set to the high level (existence of the detected object).

In CASE 3, the state signal (N) before output is at the high level (existence of the detected object), and only the CK signal becomes the high level in a case where the synchronous detection latch output (J) is at the low level (non-existence of the detected object) in a subsequent cycle. CASE 3 is opposite to CASE 2, and the low level is input to the D flip-flop circuit 116 at the first stage. In a case where CASE 3 is continued three times, the CK signal is input to the D flip-flop circuit 118 three times in the same manner, the signal processing circuit output (R) becomes the low level, and the detection output (M) is set to the low level (non-existence of the detected object).

In CASE 4, the state signal (N) before output is at the high level (existence of the detected object), only the SET signal is output at the high level in a case where the synchronous detection latch output (J) is at the high level (existence of the detected object) in a subsequent cycle, the signal processing circuit output (R) is maintained at the high level, and the detection output (M) is maintained at the high level (existence of the detected object).

CASEs 5 to 7 of truth table indicate a case where the disturbance light exists. In CASE 5, the state signal (N) before output is at the low level (non-existence of the detected object), the OR output (O) is at the high level (in a case where the non-synchronous light is detected on any one of or both the positive side and the negative-side), and only the RESET signal is output at the high level regardless whether the synchronous detection latch output (J) is at the high level (existence of the detected object) or at the low level (non-existence of the detected object) in a subsequent cycle. Therefore, the signal processing circuit output (R) is maintained at the low level, and the detection output (M) is also maintained at the low level (non-existence of the detected object). CASE 5 corresponds to the above-described Embodiments 2 and 3.

In CASE 6, the state signal (N) before output is at the high level (existence of the detected object), the OR output (O) is at the high level (in a case where the non-synchronous light is detected on any one of or both the positive side and the negative-side), and only the SET signal is output at the high level regardless whether the synchronous detection latch output (J) is at the high level (existence of the detected object) or at the lower level (non-existence of the detected object) in a subsequent cycle. Therefore, the signal processing circuit output (R) is maintained at the high level, and the detection output (M) is also maintained at the high level (existence of the detected object). Similarly to CASE 5, CASE 6 also corresponds to Embodiments 2 and 3.

In CASE 7, the counter output (Q) is at the high level (the non-synchronous light is continuously detected a plurality of times on both the positive side and the negative side), only the RESET signal is output at the high level regardless whether the state signal (N) before output, the synchronous detection latch output (J), and the OR output (O) are at the high level or the low level, and the signal processing circuit output (R) is output at the low level. That is, the detection output (M) becomes the low level (forced non-sensing). CASE 7 corresponds to Embodiment 4.

[Embodiment 5]

Embodiment 5 of the present invention will be described with reference to FIG. 7 as below.

In the embodiment, the same reference symbols are attached to components which have the same functions as the components in the above-described Embodiments 1 and 2, and the description thereof will not be repeated.

Figure 7:
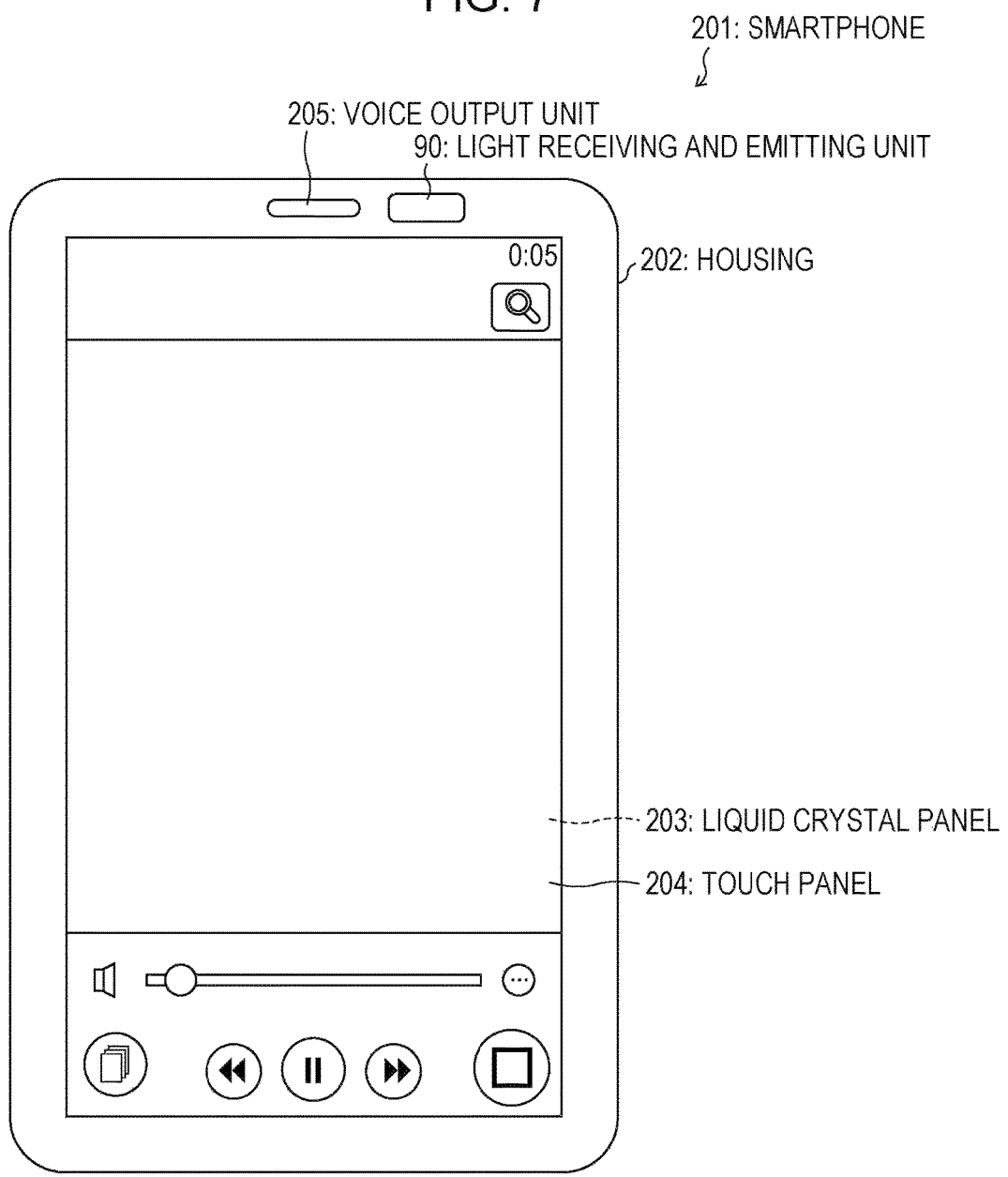
FIG. 7 is a plan view illustrating a configuration of a smartphone according to Embodiment 5 of the present invention.
Figure 8:
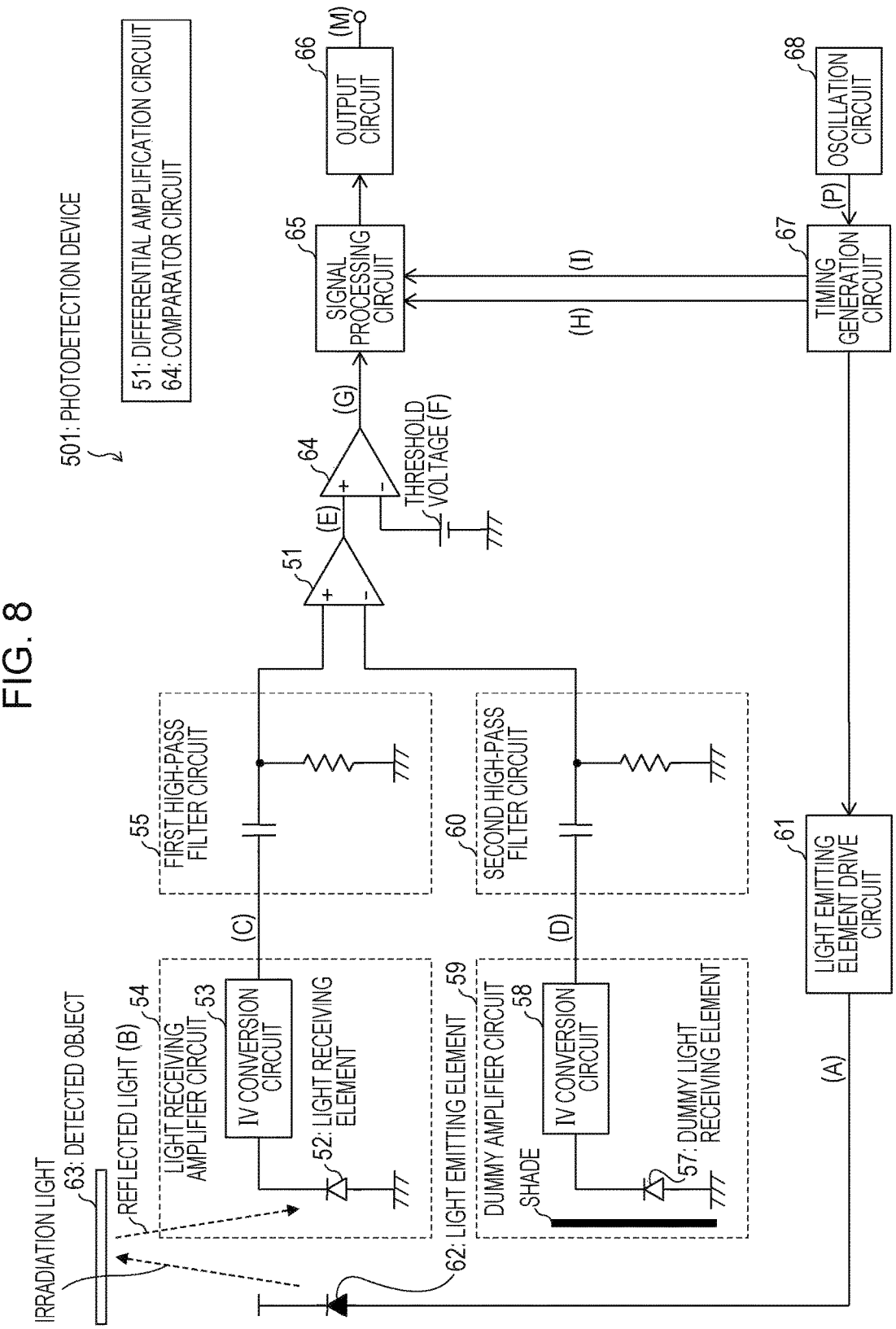
FIG. 8 is a block diagram illustrating a configuration of a photodetection device according to the related art.
Figure 9:
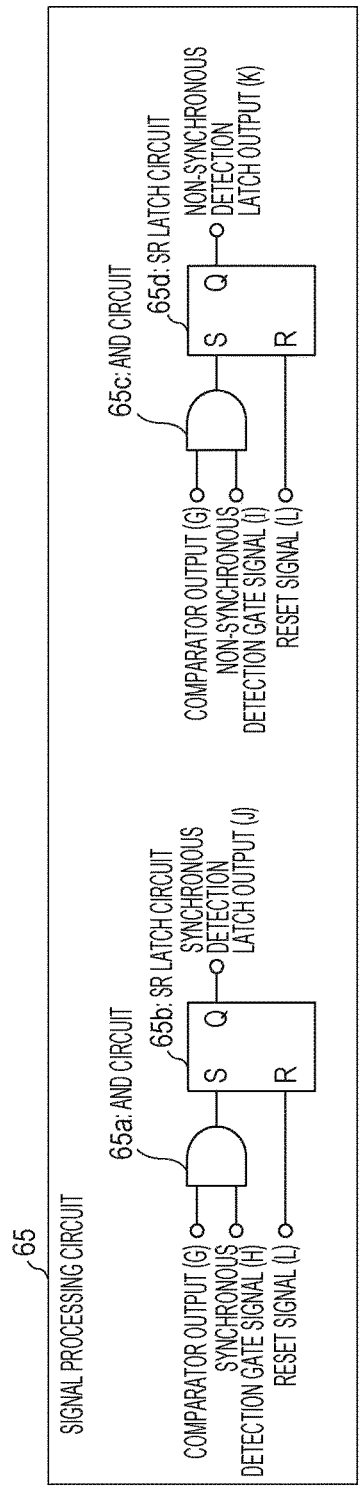
FIG. 9 is a logical circuit diagram illustrating a configuration of a signal processing circuit in the photodetection device of FIG. 8.
Figure 10:
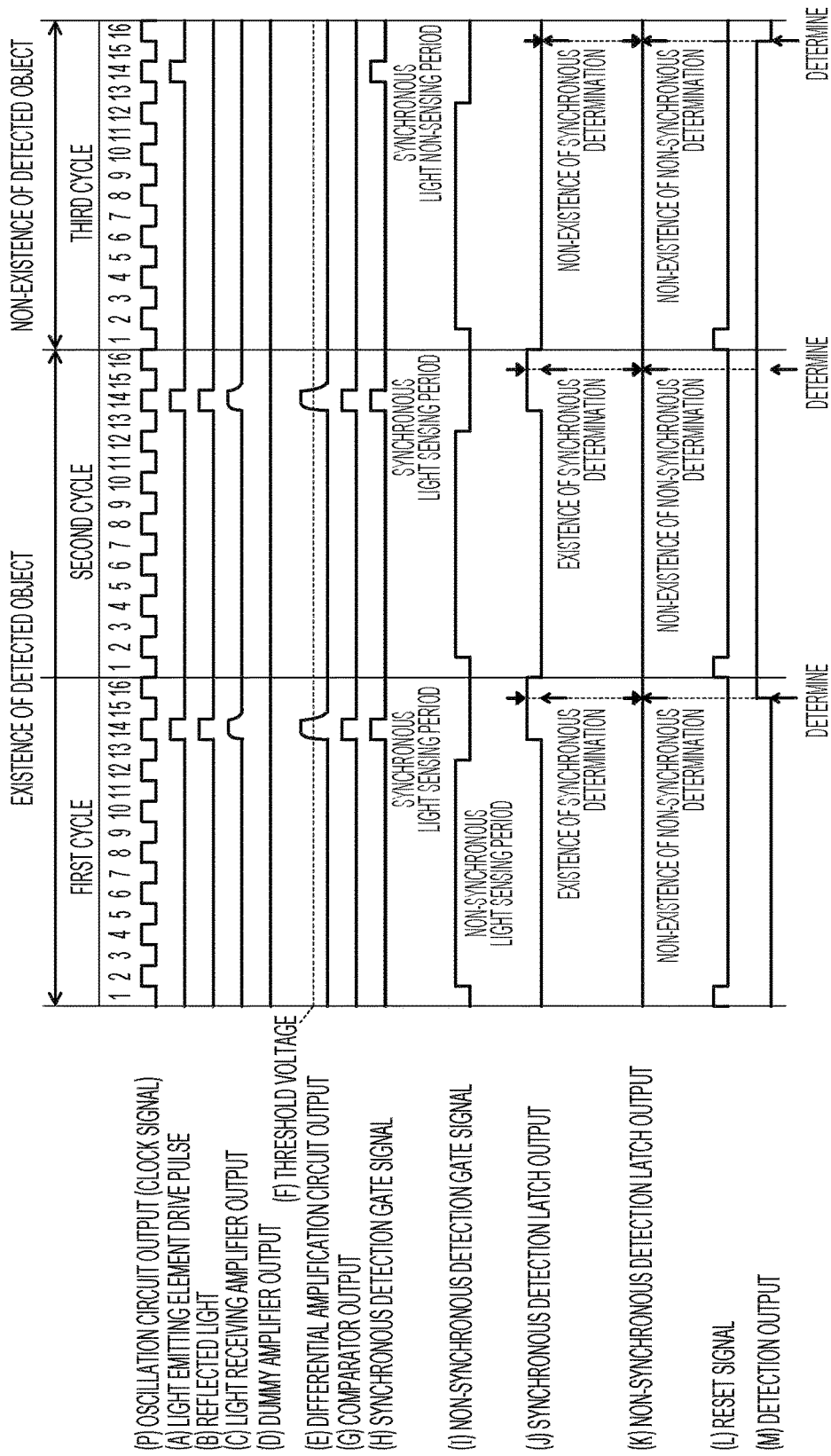
FIG. 10 is a waveform chart illustrating operational waveforms in a case where the photodetection device in FIG. 8 is normally operated.

FIG. 7 is a plan view illustrating a configuration of a smartphone 201 according to Embodiment 7 of the present invention.

It is possible to realize a reflected-light-detection or transmitted-light-detection object detection sensor which is capable of avoiding malfunctions due to various types of disturbance noise by integrating the photodetection device 101, which has the configuration according to the above-described Embodiments 1 to 4, and an optical lens which collects the light emitting pulse/signal light pulse (pulse of the reflected light (B) or the pulse of the transmitted light).

Furthermore, since it is possible to avoid the malfunctions by mounting the object detection sensor on an electronic apparatus, such as a copying machine or a mobile terminal, it is possible to realize a sensing operation with high resistance to a malfunction. In this embodiment, an example is described in which the photodetection device 101, which has the configuration according to the above-described Embodiments 1 to 4, is applied to a smartphone 201.

As illustrated in FIG. 7, the smartphone 201 as the electronic apparatus is formed in such a way that a liquid crystal panel 203 and a touch panel 204 are combined with a housing 202. In the smartphone 201, the liquid crystal panel 203 is provided on an operation screen side of the housing 202. In addition, the touch panel 204 is provided on the liquid crystal panel 203.

A voice output unit 205 and a light receiving and emitting unit 90 are disposed at the upper part of the operation screen of the housing 202. The voice output unit 205 is provided to output voice in a case where the smartphone 201 is used as a telephone, and various types of sound according to operations of application programs.

The light receiving and emitting unit 90 is a light receiving and emitting section which is provided to sense approach of the detected object 1 (for example, face of a user) or to sense a gesture operation. In addition, in a case where the smartphone 201 includes the light receiving and emitting unit 90, the photodetection device 101 is incorporated as well.

As described above, the smartphone 201 includes the photodetection device 101. Therefore, even in a case where the smartphone 201 is used under environments in which the disturbance light is generated, it is possible to appropriately determine the existence/non-existence of the detected object 1 or the like in accordance with a disturbance noise state so that malfunctions ate not generated.

CONCLUSION

A photodetection device according to Aspect 1 of the present invention includes: a light emitting element 16 that emits pulsed light; a light receiving element 21 that receives, from a detected object 1, reflected light or transmitted light of the pulsed light and outputs a light reception signal; a synchronous detection unit 111 that detects existence/non-existence of the pulsed light by detecting existence/non-existence of the light reception signal which is synchronous with light emitting drive timing in a synchronous detection period which is defined by light emitting drive timing of the light emitting element 16 in a detection period; non-synchronous detection units 112 and 113 that detect existence/non-existence of the light reception signal which is not synchronous with the light emitting drive timing in at least one of a case where it is determined that a value of the light reception signal exceeds a predetermined first threshold in a non-synchronous detection period except the synchronous detection period in the detection period and a case where the value of the light reception signal becomes less than a predetermined second threshold; and a detection result maintaining unit (signal processing circuit 11) that, in a case where the existence of the light reception signal which is not synchronous with the light emitting drive timing is detected by the non-synchronous detection units 112 and 113, maintains a result of the detection of the existence/non-existence of the light reception signal by the synchronous detection unit 111 in a subsequent detection period.

In the configuration, in a certain detection period, the existence of the light reception signal synchronous with the light emitting drive timing is detected by the synchronous detection unit 111 in the synchronous detection period, and thus the pulsed light, that is, the reflected light or the transmitted light from the detected unit is detected. In contrast, in the same detection period, the existence of the light reception signal which is not synchronous with the light emitting drive timing is detected by the non-synchronous detection unit 112 in the non-synchronous detection period in the case where it is determined that the value of the light reception signal exceeds the predetermined first threshold or by the non-synchronous detection unit 113 in the non-synchronous detection period in the case where it is determined that the value of the light reception signal becomes less than the predetermined second threshold, and thus the existence of the disturbance light, such as DC light, is detected. Alternatively, in the same detection period, in a case where it is determined that the value of the light reception signal exceeds the predetermined first threshold and it is determined that the value of the light reception signal becomes less than the predetermined second threshold by the non-synchronous detection units 112 and 113 in the non-synchronous detection period, the existence of the light reception signal which is not synchronous with the light emitting drive timing is detected, and thus the existence of the disturbance light, such as the AC light noise, is detected. In a subsequent detection period, the result of the detection acquired by the detection result maintaining unit in a previous detection period, that is, the existence/non-existence of the light reception signal synchronous with the light emitting drive timing is maintained in the subsequent detection period. Therefore, it is possible to distinguish and detect different types of disturbance light such as the DC light and the AC light noise. Therefore, it is possible to perform appropriate photodetection according to each state of the disturbance noise.

According to Aspect 2 of the present invention, in the photodetection device of Aspect 1, the non-synchronous detection units 112 and 113 may detect the existence of the light reception signal which is not synchronous with the light emitting drive timing in the case where the value of the light reception signal exceeds the predetermined first threshold or in the case where the light reception signal becomes less than the predetermined second threshold in the non-synchronous detection period.

In the configuration, in a case where the DC light as the disturbance light linearly increases, the light reception signal due to the DC light is detected by the non-synchronous detection unit in the non-synchronous detection period in the case where the value of the light reception signal exceeds the first threshold. In contrast, in a case where the DC light as the disturbance light linearly decreases, the light reception signal due to the DC light is detected by the inverted non-synchronous detection unit in the non-synchronous detection period in the case where the value of the light reception signal becomes less than the second threshold. In the cases, in the subsequent detection period, the result of the detection in the previous detection period acquired by the detection result maintaining unit is also maintained in the subsequent detection period. Therefore, even in the case where the DC light as the disturbance light linearly increases, it is possible to avoid the detection of the pulsed light performed by the synchronous detection unit being forcedly set to non-detection.

According to Aspect 3 of the present invention, in the photodetection device of Aspect 1, the non-synchronous detection units 112 and 113 may detect the existence of the light reception signal which is not synchronous with the light emitting drive timing in the case where the value of the light reception signal at least alternately exceeds the predetermined first threshold and becomes less than the predetermined second threshold in the non-synchronous detection period.

In the configuration, in a case of fluctuation in an AC manner as the disturbance light, the light reception signal due to the disturbance light in the non-synchronous detection period is detected by the non-synchronous detection unit in the case where the value of the light reception signal exceeds the first threshold and becomes less than the second threshold. In this case, in the subsequent detection period, the result of the detection in the previous detection period acquired by the detection result maintaining unit is also maintained in the subsequent detection period. Therefore, even in the case where the disturbance light which fluctuates in the AC manner is received, it is possible to avoid the detection of the pulsed light performed by the synchronous detection unit being forcedly set to non-detection.

According to Aspect 4 of the present invention, in the photodetection device according to Aspect 3, the detection result maintaining unit may output a state in which the light reception signal dues not exist in the subsequent detection period as the result of the detection in a case where the existence of the light reception signal which is not synchronous with the light emitting drive timing is detected by the non-synchronous detection units 112 and 113 in the non-synchronous detection period over the plurality of continuing detection periods.

In the configuration, in the case where the disturbance light fluctuates in the AC manner, in the non-synchronous detection period over the plurality of continuing detection periods, the existence of the light reception signal due to the disturbance light is detected by the non-synchronous detection unit. Here, regardless of the result of the detection of existence/non-existence of the light reception signal by the synchronous detection unit 111, the state in which the light reception signal does not exist in the subsequent detection period is output as the result of the detection by the detection result maintaining unit. Therefore, until the existence of the light reception signal due to the disturbance light is detected in the non-synchronous detection period over two continuing detection periods, the result of the detection in the previous detection period by the detection result maintaining unit in the subsequent detection period is also maintained in the subsequent detection period. However, in detection periods subsequent to the period, the state in which the light reception signal does not exist is output as the result of the detection. Therefore, it is possible to avoid erroneous detection in which the determination of the "existence of the detected object" is maintained in a period in which the AC light noise is input regardless of the detected object 1 not existing.

According to Aspect 5, in the photodetection device according to Aspect 4, the detection result maintaining unit may continue to output the state in which the light reception signal does not exist as the result of the detection for predetermined time.

In the configuration, in a case where the AC light noise is continuously input, it is possible to avoid chattering in which the result of the detection repeats the high level and the low level.

An electronic apparatus according to Aspect 6 includes the photodetection device according to any one of Aspects 1 to 5.

In the configuration, in the electronic apparatus, different types of disturbance light such as the DC light and the AC light noise are distinguished and detected, and thus it is possible to appropriately and optically detect existence/non-existence of the detected object or the like.

The present invention is not limited to each of the above-described embodiments, various changes are possible in a scope disclosed in claims, and embodiments, which are acquired by appropriately combining technical units respectively disclosed in different embodiments, are included in technical scope of the present invention. Furthermore, it is possible to form new technical features by combining the technical units which are respectively disclosed in the respective embodiments.

INDUSTRIAL APPLICABILITY

According to the present invention, it is possible to preferably use an electronic apparatus which includes a function of optically detecting existence/non-existence of a detected object or the like.

REFERENCE SIGNS LIST 1 detected object
2 light receiving amplifier circuit
7 first differential amplification circuit
8 second differential amplification circuit
9 first comparator circuit (first determination unit)
10 second comparator circuit (second determination unit)
11 signal processing circuit
13 timing generation circuit
15 light emitting element drive circuit
16 light emitting element
21 light receiving element
101 photodetection device
111 synchronous detection unit
112 non-synchronous detection unit
113 non-synchronous detection unit
201 smartphone (electronic apparatus)

The invention claimed is:

1. A photodetection device comprising:
a light emitting element that emits pulsed light;
a light receiving element that receives, from a detected object, reflected light transmitted light of the pulsed light and outputs a light reception signal;
a synchronous detection unit that detects existence/non-existence of the pulsed light by detecting existence/non-existence of the light reception signal which is synchronous with light emitting drive timing in a synchronous detection period which is defined by the light emitting drive timing of the light emitting element in a detection period,
a first determination unit that determines that a value of the light reception signal exceeds a predetermined first threshold;
a second determination unit that determines that value of the light reception signal becomes less than a predetermined second threshold;
a non-synchronous detection unit that detects existence of the light reception signal which is not synchronous with the light emitting drive timing in at least one of a case where it is determined that the value of the light reception signal exceeds the predetermined first threshold and a case where the value of the light reception signal becomes less than the predetermined second threshold in a non-synchronous detection period except the synchronous detection period in the detection period; and
a detection result maintaining unit that, in a case where existence of the light reception signal which is not synchronous with the light emitting drive timing is detected by the non-synchronous detection unit, maintains a result of the detection of the existence./non-existence of the light reception signal by the synchronous detection unit in a subsequent detection period.

2. The photodetection device according to claim 1, wherein the non-synchronous detection unit detects existence of the light reception signal which is not synchronous with the light emitting drive timing in the case where the value of the light reception signal exceeds the predetermined first threshold or in the case where the light reception signal becomes less than the predetermined second threshold in the non-synchronous detection period.

3. The photodetection device according to claim 1, wherein the non-synchronous detection unit detects existence of the light reception signal which is not synchronous with the light emitting drive timing in the case where the value of the light reception signal at least once exceeds the predetermined first threshold and at least once becomes less than the predetermined second threshold in the non-synchronous detection period.

4. The photodetection device according to claim 3, wherein the detection result maintaining unit outputs a state in which the light receptionsignal does not exist in a subsequent detection period as the result of the detection in a case where existence of the light reception signal which is not synchronous with the light emitting drive timing is detected by the non-synchronous detection unit in the non-synchronous detection period over a plurality of continuing detection periods.

5. An electronic apparatus comprising the photodetection device according to claim 1.

6. An electronic apparatus comprising the photodetection device according to claim 2.

7. An electronic apparatus comprising the photodetection device according to claim 3.

8. An electronic apparatus comprising the photodetection device according to claim 4.

* * * * *